US008939279B2

(12) United States Patent
Porter et al.

(10) Patent No.: US 8,939,279 B2
(45) Date of Patent: Jan. 27, 2015

(54) MODULAR CONVEYING SYSTEMS AND METHODS

(71) Applicant: Solus Industrial Innovations, LLC, Florence, KY (US)

(72) Inventors: Jim Porter, Cincinnati, OH (US); Kelly Parrish, Florence, KY (US); Lance Ireland, Cincinnati, OH (US)

(73) Assignee: Solus Industrial Innovations, LLC, Florence, KY (US)

( * ) Notice: Subject to any disclaimer, the term of this patent is extended or adjusted under 35 U.S.C. 154(b) by 0 days.

(21) Appl. No.: 14/149,674

(22) Filed: Jan. 7, 2014

(65) Prior Publication Data

US 2014/0190799 A1 Jul. 10, 2014

Related U.S. Application Data

(60) Provisional application No. 61/750,246, filed on Jan. 8, 2013.

(51) Int. Cl.

*B65G 15/30* (2006.01)
*B65G 39/20* (2006.01)
*B65G 17/40* (2006.01)

(52) U.S. Cl.

CPC ................ *B65G 15/30* (2013.01); *B65G 39/20* (2013.01); *B65G 17/40* (2013.01)

USPC .......................................... 198/779; 198/851

(58) Field of Classification Search

CPC ........ B65G 39/20; B65G 15/30; B65G 17/32; B65G 17/08; B65G 17/40

USPC .......................................................... 198/779

See application file for complete search history.

(56) References Cited

U.S. PATENT DOCUMENTS

| | | | |
|---|---|---|---|
| 2,681,728 | A | 6/1954 | Boron |
| 3,964,588 | A | 6/1976 | Kornylak |
| 4,271,960 | A | 6/1981 | Chalich |
| 4,449,448 | A | 5/1984 | Stabler et al. |
| 4,611,801 | A | 9/1986 | Pessina et al. |

(Continued)

FOREIGN PATENT DOCUMENTS

| | | | |
|---|---|---|---|
| DE | 8915491 | U1 | 7/1990 |
| DE | 3927560 | A1 | 3/1991 |

(Continued)

OTHER PUBLICATIONS

International Search Report and Written Opinion in related International Patent Application No. PCT/US2014/010367, mailed May 9, 2014, in 14 pages.

(Continued)

*Primary Examiner* — Mark A Deuble

(74) *Attorney, Agent, or Firm* — Knobbe, Martens, Olson & Bear, LLP

(57) ABSTRACT

Various modular conveyors, conveying systems, conveyor modules, and methods are disclosed. In some embodiments, the conveyor comprises a module body and an upper member. The module body can be configured to receive one or more rolling elements. In some embodiments, the rolling elements protrude through openings in the module body and the upper member. In various embodiments, the rolling elements can be configured to engage a surface below the module body and/or an item on the conveyor, thereby facilitating multi-directional travel of the item.

20 Claims, 36 Drawing Sheets

50 200 306 330 300 302 100 304 304 106 102 104

(56) References Cited

U.S. PATENT DOCUMENTS

| | | | | |
|---|---|---|---|---|
| 4,747,261 | A | 5/1988 | Frenker-Hackfort | |
| D299,424 | S | 1/1989 | Schroeder et al. | |
| D299,425 | S | 1/1989 | Schroeder et al. | |
| 4,909,380 | A | 3/1990 | Hodlewsky | |
| 5,096,050 | A | 3/1992 | Hodlewsky | |
| 5,127,510 | A | 7/1992 | Cotter et al. | |
| 5,261,525 | A | 11/1993 | Garbagnati | |
| 5,330,045 | A | 7/1994 | Hodlewsky | |
| 6,148,990 | A | 11/2000 | Lapeyre et al. | |
| 6,209,714 | B1 | 4/2001 | Lapeyre et al. | |
| 6,328,320 | B1 | 12/2001 | Walski et al. | |
| 6,345,715 | B2 | 2/2002 | Palmaer | |
| 6,364,095 | B1 | 4/2002 | Layne et al. | |
| 6,367,616 | B1 | 4/2002 | Lapeyre et al. | |
| 6,494,312 | B2 | 12/2002 | Costanzo | |
| 6,568,522 | B1 | 5/2003 | Boelaars | |
| 6,571,937 | B1 | 6/2003 | Costanzo et al. | |
| 6,585,110 | B2 | 7/2003 | Layne et al. | |
| 6,681,922 | B2 | 1/2004 | Corley et al. | |
| 6,910,572 | B2 | 6/2005 | Shibayama et al. | |
| 6,918,486 | B2 | 7/2005 | Shibayama et al. | |
| 6,986,420 | B2 * | 1/2006 | Weiser et al. | 198/853 |
| 6,997,306 | B2 * | 2/2006 | Sofranec et al. | 198/779 |
| 7,021,454 | B2 | 4/2006 | Ozaki et al. | |
| 7,073,651 | B2 | 7/2006 | Costanzo et al. | |
| 7,073,659 | B1 | 7/2006 | Lucchi | |
| 7,137,504 | B2 | 11/2006 | Ozaki et al. | |
| 7,216,759 | B2 * | 5/2007 | Rau et al. | 198/853 |
| 7,252,191 | B2 | 8/2007 | Ozaki et al. | |
| 7,364,038 | B2 * | 4/2008 | Damkjaer | 198/853 |
| 7,419,052 | B2 | 9/2008 | Ozaki et al. | |
| 7,563,188 | B2 | 7/2009 | Ozaki et al. | |
| 7,644,710 | B2 | 1/2010 | Oh | |
| 7,942,257 | B2 | 5/2011 | DePaso et al. | |
| 2001/0045346 | A1 | 11/2001 | Costanzo | |
| 2003/0116409 | A1 * | 6/2003 | Marsetti et al. | 198/844.1 |
| 2004/0173441 | A1 | 9/2004 | Wieting et al. | |
| 2004/0222073 | A1 | 11/2004 | Oreste | |
| 2006/0260917 | A1 | 11/2006 | Ozaki et al. | |
| 2008/0067040 | A1 | 3/2008 | Gundlach | |

FOREIGN PATENT DOCUMENTS

| | | | |
|---|---|---|---|
| DE | 4115707 | A1 | 11/1992 |
| EP | 1706337 | B1 | 7/2008 |
| JP | 51-20796 | | 6/1976 |
| JP | S51-21255 | | 6/1976 |
| JP | S59-33816 | | 3/1984 |
| JP | 60-061404 | | 4/1985 |
| SE | 211992 | | 11/1966 |

OTHER PUBLICATIONS

Polyketting, “Multi-/Flexiwheel Transporteur Conveyor Forderer”, 4 pages.

Polyketting, “Polyketting Components”, www.polyketting components.com/intralox.html, dated Mar. 27, 2012, 1 page.

* cited by examiner

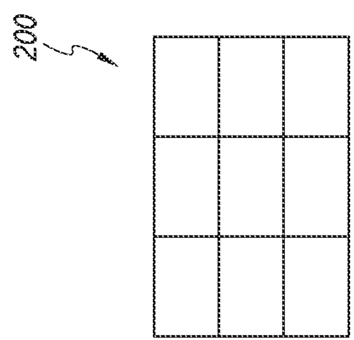
FIG. 5A
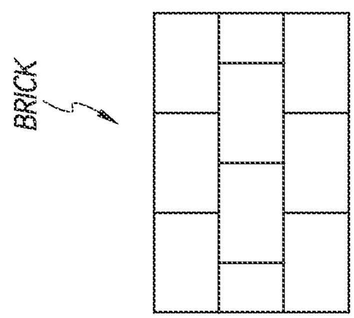

202
204
304
206
314
312
310
316
318
330
338
306
332
336
322'
330
322
302
206
200
322

432
434
436
434
430

428
426
424

230
521
530
506
542
540
502
504
522
524
526

230
524
526
508
506
510
520
522
530
532

540
542
546
548
500
502
504
506
510
512
514
516
518
524
526
530
532

510
524
526
530
532
506
542
546
548

600
621
638
604
612
610
618
622
606
620
632
638
636
618
612
604
610
618
622
600
620
606
618
612
632
638
W
612
604
610
622
620
606
612
618
632
636
600
638

638
632
606
636
604
618
602
612
614
620
610
622
600

MODULAR CONVEYING SYSTEMS AND METHODS

CROSS REFERENCE TO RELATED APPLICATIONS

All applications for which a foreign or domestic priority claim is identified in the Application Data Sheet as filed with the present application are hereby incorporated by reference herein under 37 C.F.R. §1.57.

The present application claims the priority benefit under at least 35 U.S.C. §119 of U.S. Patent Application No. 61/750,246, filed Jan. 8, 2013, the entirety of which is hereby incorporated by reference herein.

BACKGROUND

1. Field

The disclosure relates generally to the field of conveyors and, in some embodiments, to modular conveyors and modular conveyor systems.

2. Description of the Related Art

Conveyors are commonly employed in various commercial and manufacturing applications to transport objects between different processing stations and locations. A conveyor typically includes a conveyor belt or chain that is arranged in an endless loop and driven to transport the objects on the belt or chain surface along a generally horizontal path. The conveyor can be made of a plurality of individual links or modules. Adjacent links can be hingedly connected with one another, thereby allowing the links to form the conveyor.

SUMMARY

Conveyor systems can comprise a belt-moving device (e.g. a sprocket with a powering mechanism) and modular conveyors (e.g. an endless loop or belt) having a plurality modules. In some embodiments, the belt-moving device is configured to engage and move the modular conveyor forward or backward. Over time, friction between the moving parts in the conveyor system can cause wear. In some instances, individual modules may wear (e.g. erode or deteriorate) compromising the integrity of the entire modular conveyor. Given the limitations of current conveyor systems, certain aspects of the disclosure are directed towards embodiments of modular conveyors with increased strength, stability, and/or resistance to wear.

In some embodiments, the disclosed modular conveyors comprise rows of modules. In some embodiments, each row of modules extends generally perpendicular to the direction of travel of the modular conveyor. In certain embodiments, the modular conveyor comprises a plurality of modules arranged in rows and columns, wherein the rows extend in a direction generally perpendicular to the direction of belt travel and the columns extend in a direction generally parallel to the direction of belt travel.

In certain implementations, each module includes a module body. Each module body can include a width and a thickness. The width can extend between a first lateral side of the module body and a second lateral side of the module body. The thickness can extend generally parallel to the direction of travel of the conveyor between a front side of the module body and a rear side of the module body. The module body can be linked to a forwardly-adjacent module and a rearwardly-adjacent module, such as with a first retaining pin and a second retaining pin, respectively.

In some embodiments, the module body comprises a front leg extending forwardly from the front side and/or a rear leg extending rearwardly from the rear side. The front leg can have a laterally extending first passage. The rear leg can have a laterally extending second passage. In some embodiments, the module body has a single (e.g., only one) front leg extending forwardly from its front side. In some variants, the module body includes a single (e.g., only one) rear leg extending rearwardly from its rear side. In certain variations, the module body has a seat and a first opening. The seat can be in communication the first opening. In some variants, the module body has a first securing element.

In some implementations, the module includes an upper member (e.g., a cover, plate, or otherwise) configured to engage the module body. In certain embodiments, the upper member spans at least a majority of the width of the module body. In some variants, the upper member spans substantially the entire width of the module body. The upper member can comprise a second opening. The upper member can include a second securing element configured to engage with the first securing element to secure the upper member with the module body.

In some embodiments, the module has a rolling element, such as a substantially spherical element (e.g., a ball). The rolling element can be positioned at least partly in the module seat. In some embodiments, when the spherical rolling element is positioned in the seat and the upper member is secured to the module body, a lower portion of the spherical rolling element extends through the first opening (e.g., which can facilitate engaging the spherical rolling element with a surface below the module) and an upper portion of the spherical rolling element extends through the second opening (e.g., which can facilitate multi-directional movement of an item on the conveyor). In various implementations, a dimension (e.g., a diameter) of the spherical rolling element is greater than a dimension (e.g., a diameter) of the first opening and/or second opening. This can aid in securing and/or maintaining the rolling element in the module. In several variants, the spherical rolling element can move (e.g., rotate) relative to the module body and the upper member.

In some embodiments the first retaining pin is configured to extend through the laterally extending first passage of a module body and into the forwardly-adjacent module to link the module and the forwardly-adjacent module. In some embodiments, the second retaining pin is configured to extend through the laterally extending second passage and into the rearwardly-adjacent module to link the module and the rearwardly-adjacent module.

Any of the embodiments described above, or described elsewhere herein, can include one or more of the following features.

In some embodiments, the first securing element comprises a securing hole. In some embodiments, the second securing element comprises a cantilevered member, such as a leg. The cantilevered member can have a connection member, such as a flange, lip, groove, detent, or otherwise.

In certain implementations, the module body has a first alignment element and the upper member has a second alignment element. The first and second alignment elements can be configured to interact to guide the first and second securing elements into engagement. In some variants, the first alignment feature is an alignment aperture and the second alignment feature is a tapered post that is configured to be received in the alignment aperture.

In certain embodiments, the module includes a plurality of rolling elements (e.g., substantially round balls) and a corresponding number of seats. For example, the module can include two rolling elements and two seats, three rolling elements and three seats, four rolling elements and four seats, or otherwise. In several embodiments, each seat at least partially receives one rolling element.

In some implementations, the conveyor includes a pin securing member, such as a clip, retaining ring, fastener, or otherwise. The pin securing member can be configured to engage the first retaining pin. In some variants, the module is configured to partially or substantially entirely receive the pin securing member, such as in a recess in the module.

In certain variants, the conveyor comprises a securing feature configured secure the pin securing member with the module. For example, the securing feature can comprise a pin or dowel that engages a first securing aperture in the module and a second securing aperture in the clip, thereby inhibiting removal of the clip from the module. In some implementations, the securing feature is removable.

In some embodiments, a front leg of the module has a finger configured to be received in a recess in a rearwardly extending leg of the forwardly-adjacent module and/or a rear leg of the module has a recess configured receive a finger on a forwardly extending leg of the rearwardly-adjacent module. In certain variants, the finger of the module is engagable with (e.g., insertable into) the recess in the rearwardly extending leg of the forwardly-adjacent module only when the module is positioned at an angle $\alpha$ relative to the forwardly-adjacent module. In some variants, the angle $\alpha$ is at least about: 60°, 80°, 90°, 100°, 110°, 120°, 135°, values between the aforementioned values, or otherwise. In certain embodiments, the angle $\alpha$ is at less than or equal to about: 100°, 90°, 75°, 60°, 45°, 30°, values between the aforementioned values, or otherwise.

In certain variants, each row of the conveyor include a plurality of the modules. In some embodiments, the plurality of the modules are arranged in rows and columns. The rows can extend in a direction generally perpendicular to the direction of belt travel. The columns can extend in a direction generally parallel to the direction of belt travel.

In certain implementations, the first lateral side of the module body comprises a male lateral linking feature and the second lateral side of the module body comprises a female lateral linking feature. In some embodiments, the male lateral linking feature of one of the plurality of modules engages with the female lateral linking feature of a laterally adjacent one of the plurality of modules.

In several embodiments, a module for a modular conveyor includes a module body, a plate, and one or more rolling elements. The module body can have a top portion with a channel, such as a groove, hollow, recess, or otherwise. The module body can have a bottom portion with a front side, a rear side, a first lateral side, and a second lateral side. In certain variants, the front side has a single (e.g., only one) forwardly-extending leg and/or the rear side has a single (e.g., only one) rearwardly-extending leg. In some embodiments, the bottom portion includes one or more recesses (e.g., to facilitate rolling of the rolling elements). In some variants, the bottom portion includes a first securing feature. In some implementations, the bottom portion has a first opening. In certain embodiments, the front side and the rear side of the module body extend generally transverse to the direction of travel of the conveyor belt. A width of the module body can extend the distance between the first lateral side and the second lateral side. The width can be generally transverse to the direction of travel of the conveyor belt. The forwardly extending leg can have a laterally extending first passage configured to receive a first retaining pin. The rearwardly extending leg can have a laterally extending second passage configured to receive a second retaining pin.

In certain embodiments, the plate can be received in the channel of the module body. In some variants, a top surface of the plate is about flush with a top surface of the forwardly extending leg and a top surface of the rearwardly extending leg. The plate can have a width that is generally transverse to the direction of travel of the conveyor belt. In some embodiments, the width of the plate is greater than or equal to a majority of the width of the module body. The plate can include a second opening and/or a second securing feature that is engaged with the first securing feature to secure the plate and the module body together.

In some implementations, the plurality of rolling elements are positioned the recesses of the module body (e.g., one rolling element per recess). In various implementations, the rolling elements can move (e.g., spin) relative to the module body. According to certain variants, the rolling elements protrude through the first opening and the second opening, which can facilitate multi-directional movement of an item on the conveyor. In some embodiments, the rolling elements are substantially spherical in shape.

Certain aspects of the disclosure are directed to methods of manufacturing and/or using a module for a modular conveyor. In some embodiments, the method comprises obtaining (e.g., procuring, forming, or otherwise) a module body, such as a module body with a front side having a single forwardly extending leg, a rear side having a single rearwardly extending leg, a first lateral side, a second lateral side, a first opening, a seat, a first securing feature, and/or a first alignment feature. In some embodiments, the method includes obtaining a module upper member, such as a module upper member with a second securing feature, a second alignment feature, and/or a second opening. In certain variants, the method includes placing a rolling element in the seat of the module body. The method can include aligning the first and second securing features by engaging the first and second alignment features. Certain embodiments of the method include securing the module upper member and the module body by engaging the first and second securing features. In some embodiments, one of the first and second aligning features comprises a tapered projection and the other of the first and second aligning features comprises a first mating aperture. In certain variants, one of the first and second securing features comprises a projection with a lip and the other of the first and second securing features comprises a second mating aperture.

BRIEF DESCRIPTION OF THE DRAWINGS

FIG. 5A is a schematic illustration of various module arrangements.

DETAILED DESCRIPTION OF CERTAIN EMBODIMENTS

A variety of modular conveyors and modular conveyor systems are described below to illustrate various examples that may be employed to achieve one or more desired improvements. These examples are only illustrative and not intended in any way to restrict the general inventions presented and the various aspects and features of these inventions. Furthermore, the phraseology and terminology used herein is for the purpose of description and should not be regarded as limiting. No features, structure, or step disclosed herein is essential or indispensible.

Figure 1A:
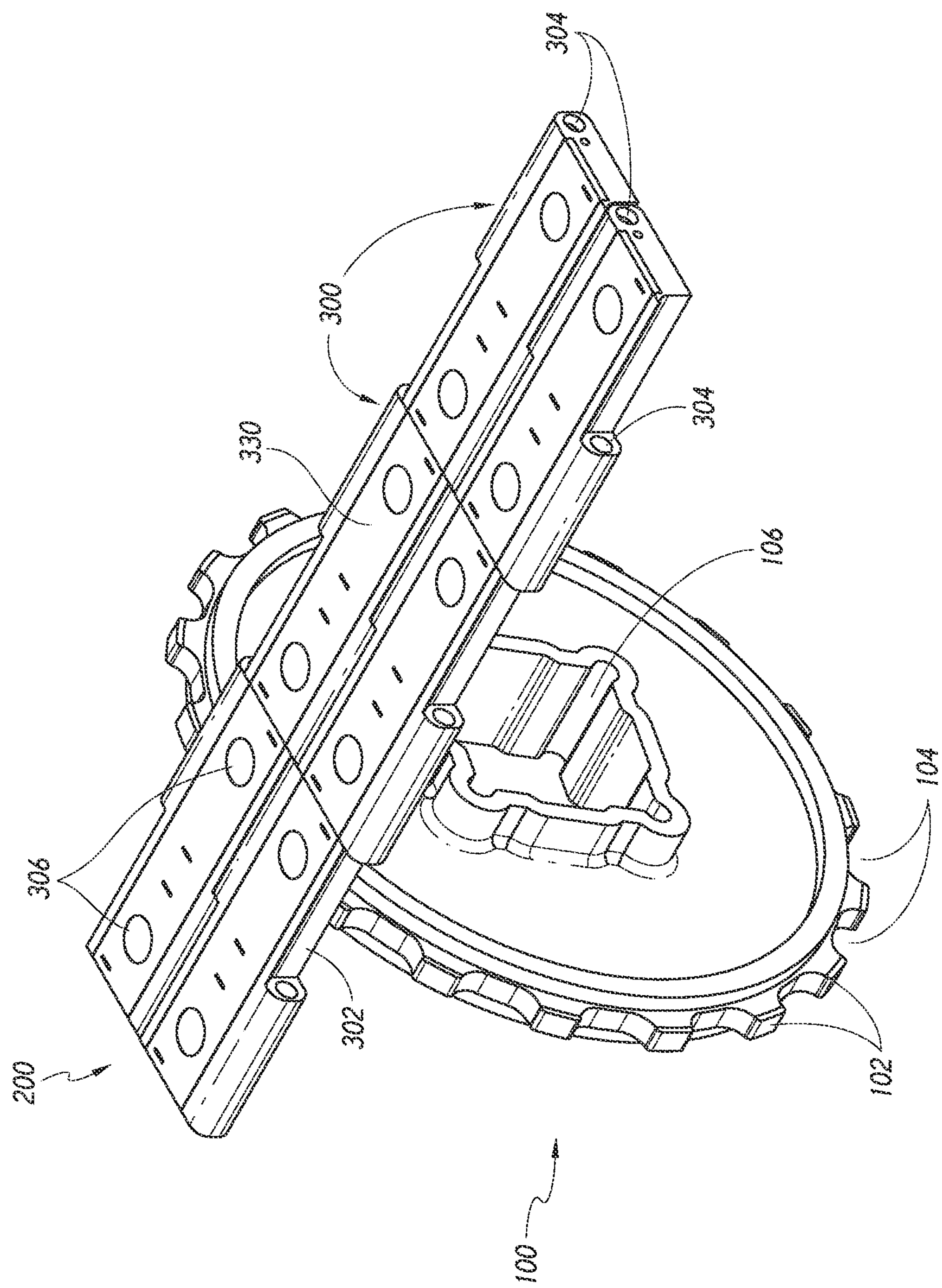
FIGS. 1A and 1B are perspective views of an embodiment of a modular conveyor system engaging a sprocket.
Figure 1B:
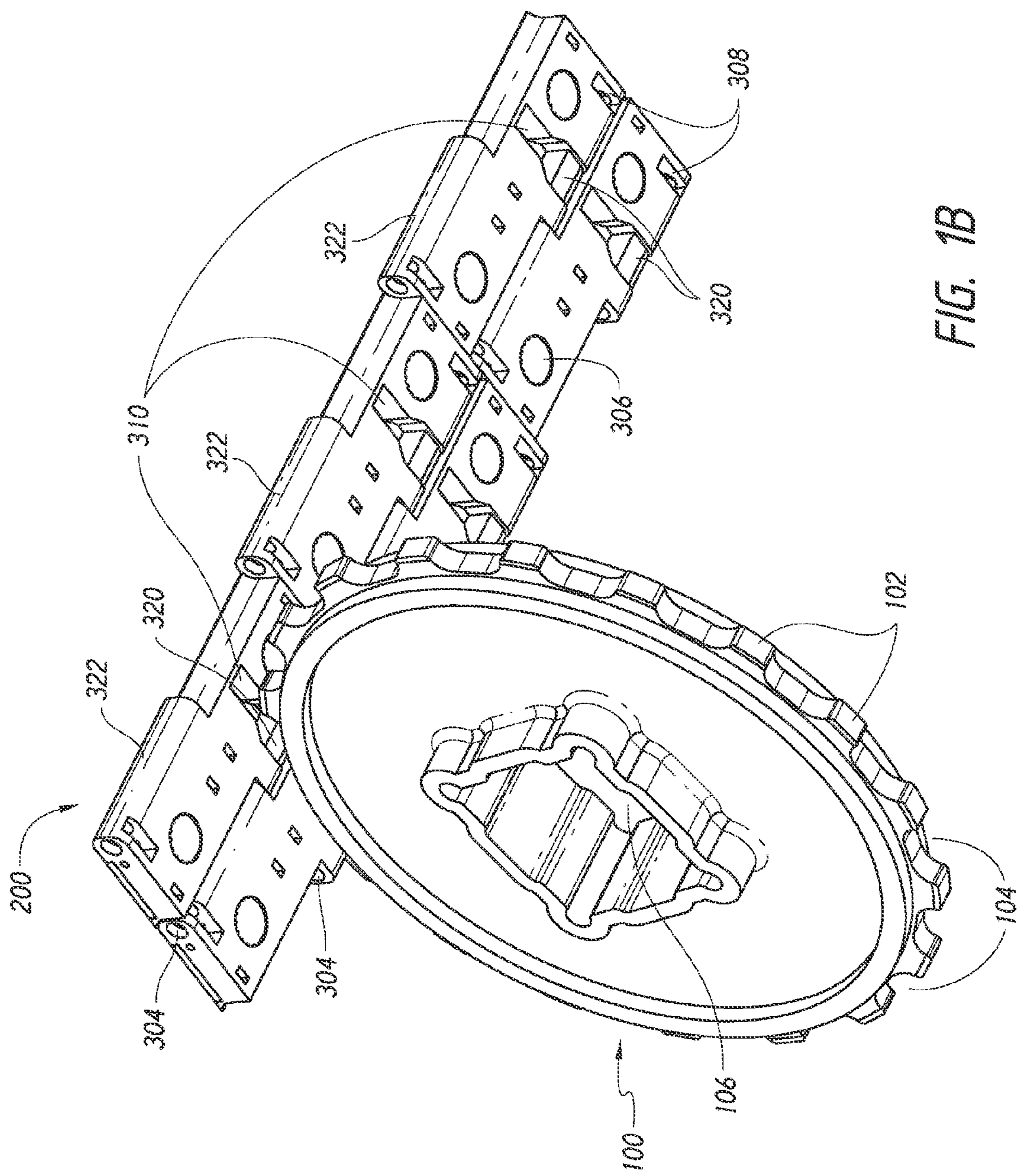

FIGS. 1A and 1B illustrate an embodiment of a portion of a modular conveyor system 50. The modular conveyor system 50 can include a modular conveyor 200 having a plurality of modules 300. In some embodiments, the modules 300 are connected to form an endless loop (e.g., a conveyor belt). In some embodiments, the modules 300 are configured to engage a sprocket 100, which can encourage movement of the modular conveyor 200 and thus the goods disposed on the modular conveyor 200. In some embodiments, the rotation of the sprocket 100 can be reversed to encourage movement of the modular conveyor 200 in the reverse direction. In certain implementations, the sprocket 100 includes a drive engagement portion 106 that is configured to receive a shaft (not shown) to facilitate rotation of the sprocket 100, and thus movement of the modular conveyor 200.

In some embodiments, the modules 300 include a top surface on which goods are conveyed, a bottom surface, a front, a rear, and lateral sides. As used herein, "front" is in the direction of belt travel and "rear" is in the direction opposite to the direction of belt travel. In some embodiments, in addition to forming an endless loop, the width of the conveyor can be decreased or extended. The width of the conveyor can be decreased by laterally subtracting modules 300 from the modular conveyor 200. The width of the conveyor can be increased by laterally adding modules 300 to the modular conveyor 200. For instance, although FIG. 1A shows a modular conveyor 200 that is three modules 300 wide, conveyors having a width of other numbers of modules can be used, such as 1, 2, 4, 5, 6, 7, 8, 9, 10, 20, 30 values in between the aforementioned values, and otherwise.

In some embodiments, as shown in FIG. 1A, the modules 300 include a body 302 and a rolling element 306 (e.g., a spherical ball). In some variants, the modules 300 include a plurality of rolling elements 306, such as 2, 3, 4, or more. For example, as shown, the modules 300 can include a first rolling element 306 positioned in a first lateral side region and a second rolling element 306 positioned in a second lateral side region. In some embodiments, the rolling elements 306 are substantially symmetrically positioned on either side of a centerline of the modules 300 along the axis of belt travel. In some embodiments, for instance, when an odd number of rolling elements (e.g., 3, 5, 7, etc.) is used, the rolling elements can be distributed symmetrically along the module and on the centerline. In some embodiments, the rolling elements are distributed asymmetrically along the module body.

Figure 1C:
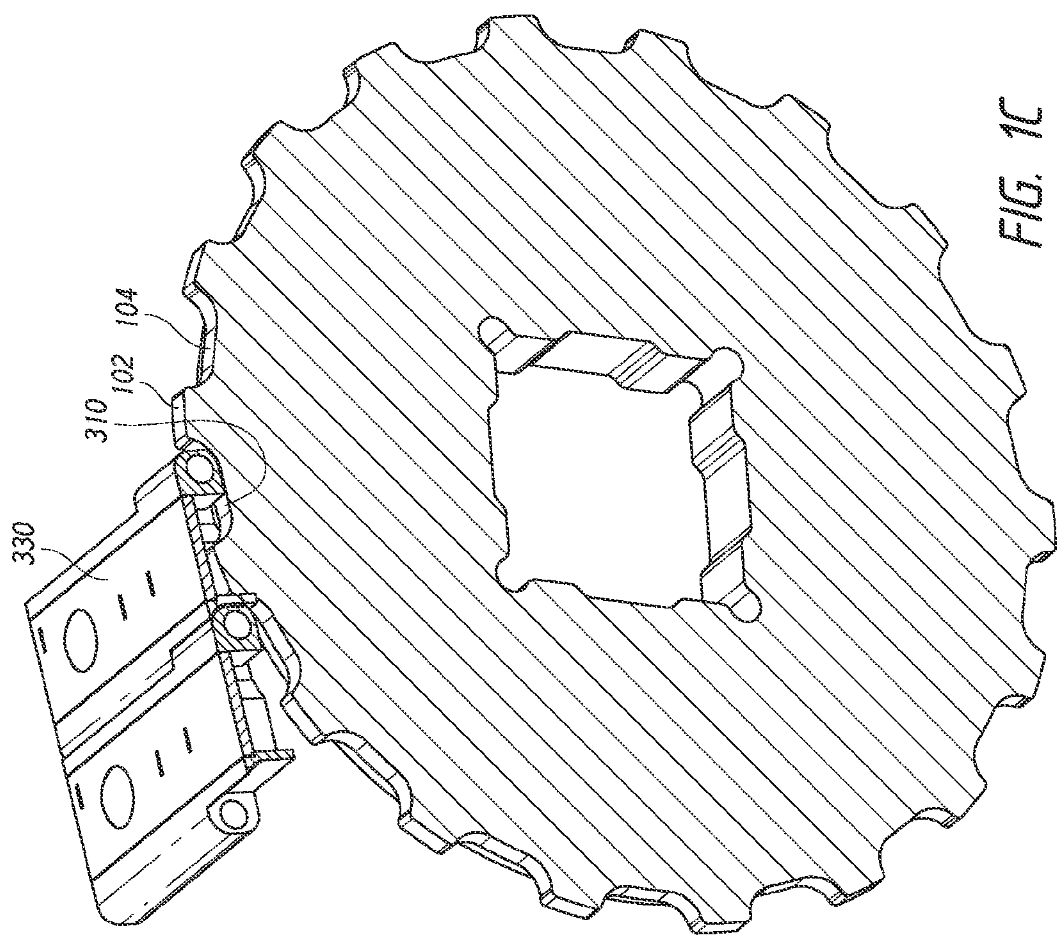
FIG. 1C is a cross-sectional view of the modular conveyor system and sprocket from FIGS. 1A and 1B.

In some embodiments, such as is shown in FIGS. 1B and 1C, at least some of the modules 300 include a sprocket recess 310 that is configured to engage with the sprocket 100. In certain variants, the sprocket recess 310 allows for the engagement of a driving member (such as a tooth 102) of the sprocket 100. In some embodiments, the depth of the sprocket recess 310 is approximately equal to the total thickness of the module body 302 of the module 300, as illustrated. In some embodiments, the recess 310 passes completely through the body 302. In some implementations, the sprocket recess 310 includes a step 320 to provide for clearance of the tooth 102 during rotation of the sprocket 100 relative to the module 300. In some embodiments, the size of the step 320 is defined as a ratio of the depth of the sprocket recess 310. In certain implementations, the ratio of the height of the step 320 to the depth of the sprocket recess is at least about: 1:100, 1:25, 1:10, 1:5, 1:4, 1:3, 1:2, 2:3, 4:5, 5:6, 6:7, 7:8, 9:10, 99:100, values in between the aforementioned values, and otherwise.

In certain implementations, the modular conveyor 200 includes rows of the modules 300. For example, in the embodiment illustrated in FIG. 2A, the row includes modules 300A, 300B, and 300C. As shown, the modules 300 can be arranged laterally. In some variants, the row can extend laterally from side to side of the modular conveyor 200.

In certain embodiments, the modules 300 include a passage 304, which can be configured to receive at least a portion of a lateral retaining element, such as a retaining pin 202. In the illustrated embodiment, the retaining pin 202 can be received through the passages 304 of the modules 300A, 300B, and 300C laterally via the passage 304. In some implementations, the passage 304 is positioned in a forwardly or rearwardly extending leg 322 of the module 300.

Figures 2A, 2B:
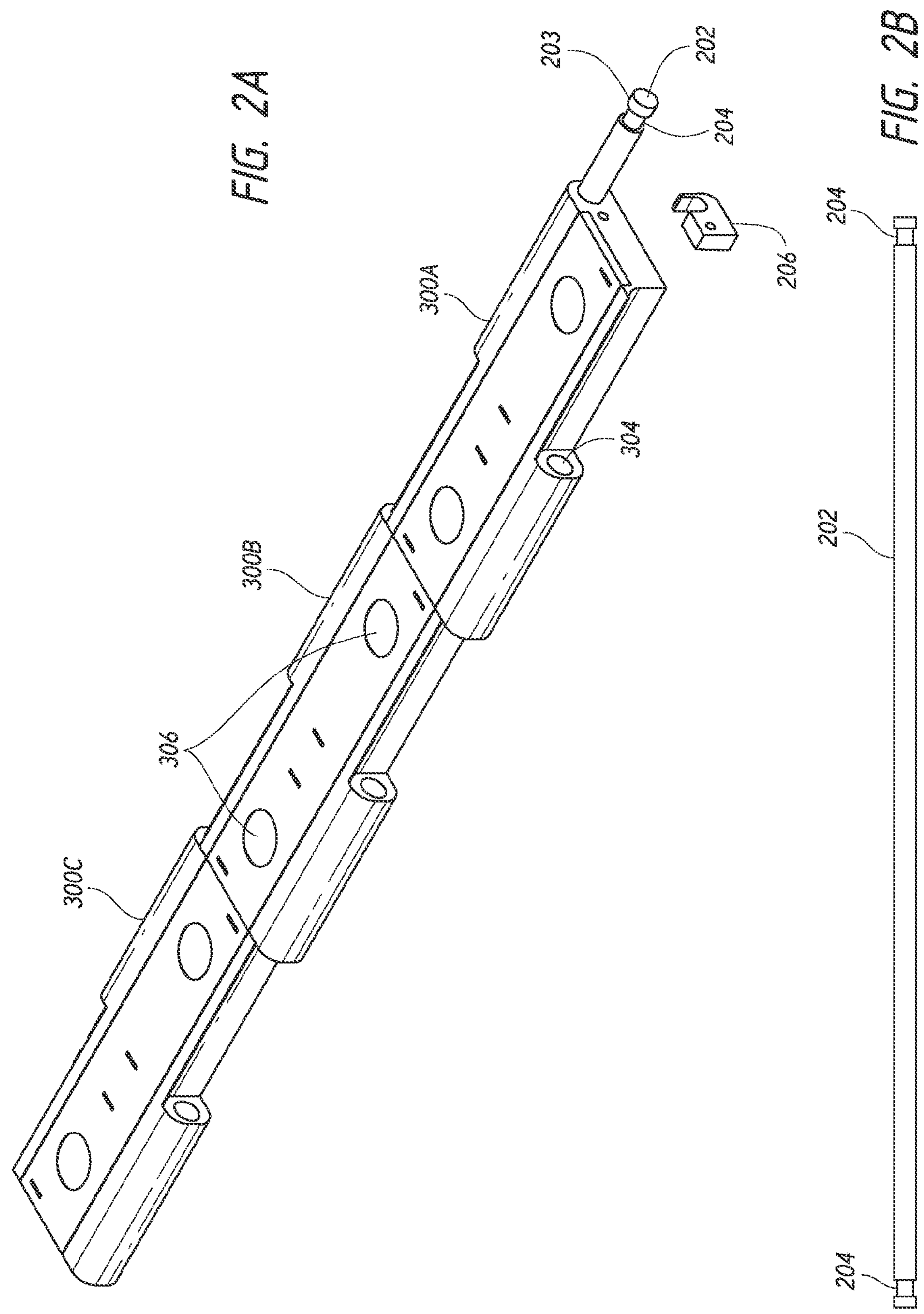
FIG. 2A is a perspective view of a lateral row of modules, a clip, and a retaining pin partially inserted into the row of modules.
FIG. 2B is a front view of the retaining pin of FIG. 2A.

As illustrated in FIG. 2B, the retaining pin 202 can include an elongate body with a first end and a second end. In some embodiments, the retaining pin 202 has a pin channel 204, such as a region of reduced diameter or thickness. In some variants, the channel 204 is located at or near at least one of the ends. As shown, the pin channel can be bounded by shoulders. In some embodiments, the pin channel 204 includes a head portion 203 which can have a greater diameter or thickness than the pin channel 204. In certain implementations, the retaining pin 202 is configured to have an elongate length that is less than or about equal to the lateral width of the conveyor (e.g., the width of the row of the modules 300). In some implementations, the retaining pin 202 is made of plastic or metal, such as stainless steel or aluminum.

In some embodiments of the retaining pin 202 has two pin channels 204 at the terminus of each end of the retaining pin 202. In some embodiments, the retaining pin 202 can have less than two pin channels 204. In certain variants, the retaining pin 202 can have more than two pin channels 204. In some implementations, the retaining pin 202 has at least one pin channel 204 per module 300 through which the retaining pin 202 passes. In some variants, the pin channels 204 can be spaced such that each pin channel 204 generally aligns with each recess 308 of each of the modules 300 through which the retaining pin 202 passes. In some embodiments, the retaining pin 202 links the modules 300 in a front-to-back columnar fashion, as will be described below.

Figure 3A:
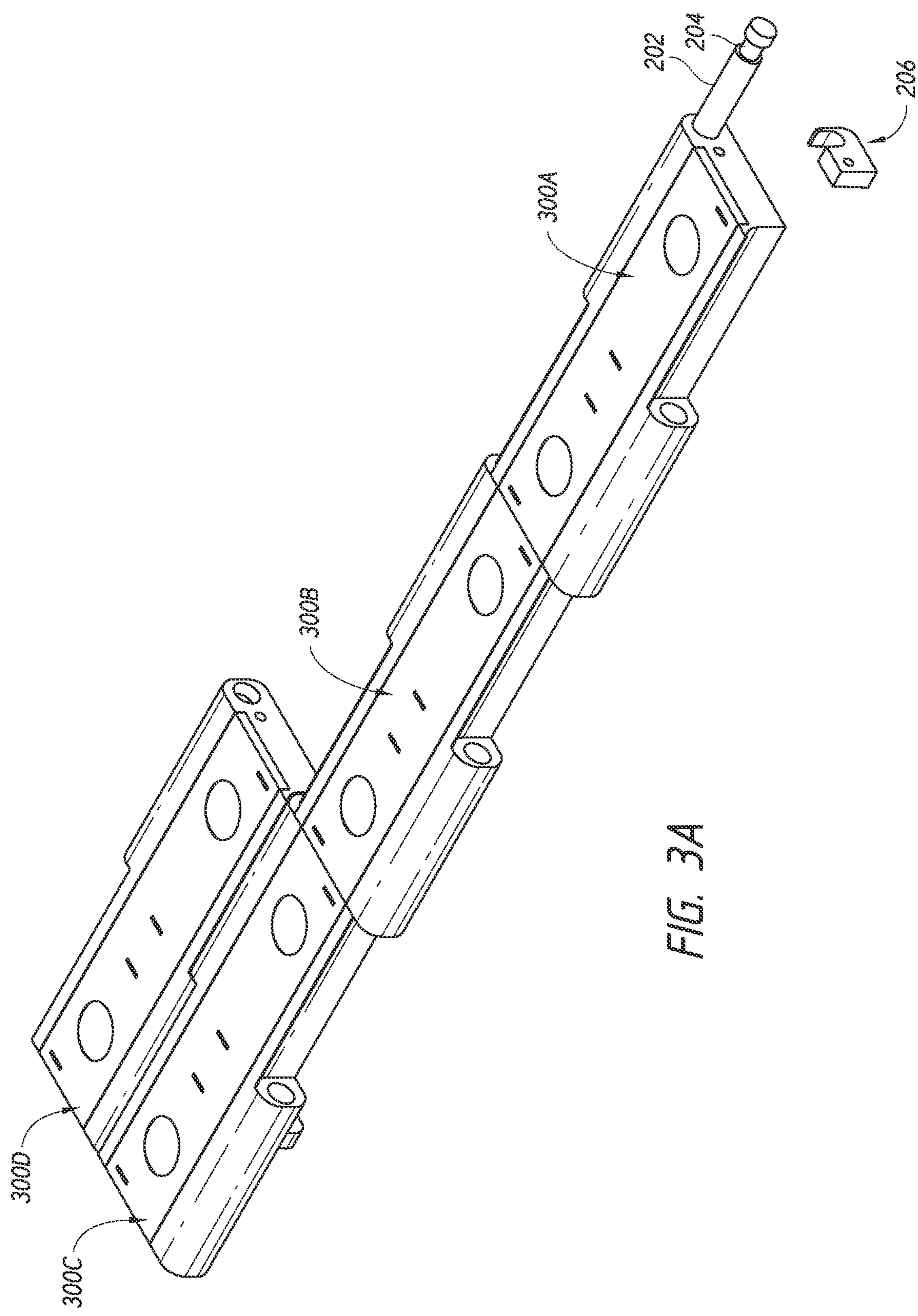
FIGS. 3A and 3B are top and bottom perspective views of a row of three modules and a column of two modules coupled by the retaining pin of FIG. 2B.
Figure 3B:
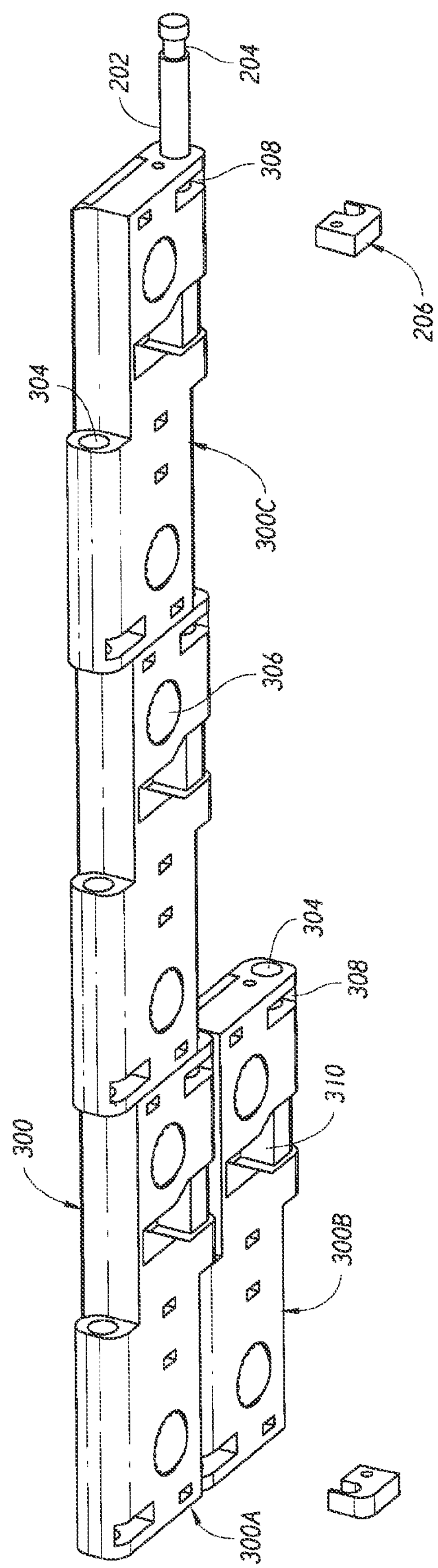

With reference to FIGS. 3A and 3B, in some embodiments, when fully inserted into the lateral row of modules 300A-300C, at least one of the ends of the retaining pin 202 can be position generally flush with, or recessed with respect to, a lateral sidewall of the modular conveyor 200. For example, an end of the retaining pin 202 can be generally flush with, or recessed with respect to, a lateral sidewall of the module 300A and/or the module 300D.

In some variants, the retaining pin 202 can be secured to the modules 300 with a securing element, such as a clip 206. The clip 206 can include an opening 207 that is configured to receive the pin channel 204, such as by a snap fit or interference fit. In some embodiments, the clip 206 is received in a securing member engagement (e.g., a recess 308) of the modules 300. In some variants, the recess 308 can be located so as to open onto the bottom of the module 300, which can facilitate insertion and removal of the clip 206. For example, in some implementations, the clip 206 can be removed from the recess 308 with an elongate tool, such as a screwdriver or an awl. The recess 308 can intersect with the passage 304. In some embodiments, when the pin 202 is positioned in the passage 304 such that the pin channel 204 is generally aligned with the recess 308, the clip 206 can be inserted in the recess 308 and the pin channel 204 can be securely received in the opening 207 of the clip 206. In certain embodiments, the engagement of the clip 206 into the recess 308 and the pin channel 204 into the clip 206 secures the pin 202 relative to the modules 300. For example, the pin 202 can be inhibited from moving laterally relative to the clip 206 due to an interference between the clip 206 and the shoulders of the pin 202 on either side of the channel 204. In some variants, the clip 206 can be inhibited from moving laterally relative to the modules 300 due to an interference between the clip 206 and the walls of the recess 308. Thus, the pin 202, clip 206, and modules 300 can be laterally secured relative to each other.

In certain embodiments, as illustrated, the configuration of the retaining pin 202 and modules 300 facilitates lateral transfer of force between the retaining pin 202 and modules 300. In some embodiments, this lateral transfer of force can reduce the individual forces that the pin 202 experiences and/or can reduce the force that the pin 202 transmits to the modules 300A, 300C at the lateral edges of the modular conveyor 200. For example, certain embodiments can reduce the likelihood of damage to the lateral modules 300A, 300C at the lateral edge of a conveyor belt and can reduce the likelihood of damage to the retaining pin 202. In certain implementations, reducing damage to the retaining pin 202 and/or to the lateral modules 300A, 300B helps prevent the retaining pin 202 and modules 300 from disengaging from the modular conveyor 200. This force transfer can be accomplished using the retaining pin in combination with any of the various module designs and arrangements described below.

In some embodiments, another clip 206 can engage another channel 204 of the retaining pin 202. In certain implementations, the engagement of the clips 206 and respective channels 204 of the pin 202, as well as the engagement of the clips 206 and the respective recesses 308 of the modules 300, can laterally secure a plurality of the modules 300 relative to each other. For example, as the modules 300 that have received the clips 206 are secured to the pin 202 (via the clips 206 and the channels 204), those modules 300 are laterally secured relative to each other.

In certain variants, the modules 300 at the lateral sides of the conveyor 200 are configured to receive the clip 206. In some embodiments, the engagement of the modules 300 at the lateral sides of the conveyor 200 with the clips 206 and the channels 204 (e.g., in the manner discussed above) can provide lateral securement of intermediate modules (e.g., modules positioned between the modules at the lateral side edges of the conveyor). As noted above, some variants of the retaining pin 202 have the second channel 204 located at or near the other end of the retaining pin 202. As also noted above, some embodiments of the retaining pin 202 have an elongate length that is about equal to the width of a row of the modules 300. Indeed, in some embodiments, the pin 202 has a length that is about equal to a multiple of the lateral width of the modules 300. For example, in some implementations, the pin 202 can have an elongate length that is about the same as the lateral width of the module, or at least about: twice, three times, four times, five times, or six times the lateral width of the module. In some embodiments, the pin 202 is configured such that, when the modules 300 of a row are positioned on the pin 202, the modules 300 are generally abutted with the modules 300 that are laterally adjacent. In some embodiments in which the modules 300 at the lateral sides of the conveyor 200 are laterally secured, the intermediate modules can be generally inhibited from moving laterally as well.

Accordingly, in certain embodiments, the pin 202 can be inhibited from moving laterally with respect to the row of modules 300, and each of the modules 300 can be inhibited from moving laterally with respect to the other modules of that row. In some embodiments, engagement of the clip 206 with the channel 204 and with the walls of the recess 308 can inhibit the modules 300 at the lateral sides of the conveyor 200 from moving laterally. In turn, the modules 300 at the lateral sides of the conveyor 200 can provide lateral containment of the intermediate modules 300 in the row. Such a configuration can, for example, increase the strength of the conveyor 200 in the lateral direction.

Figure 4A:
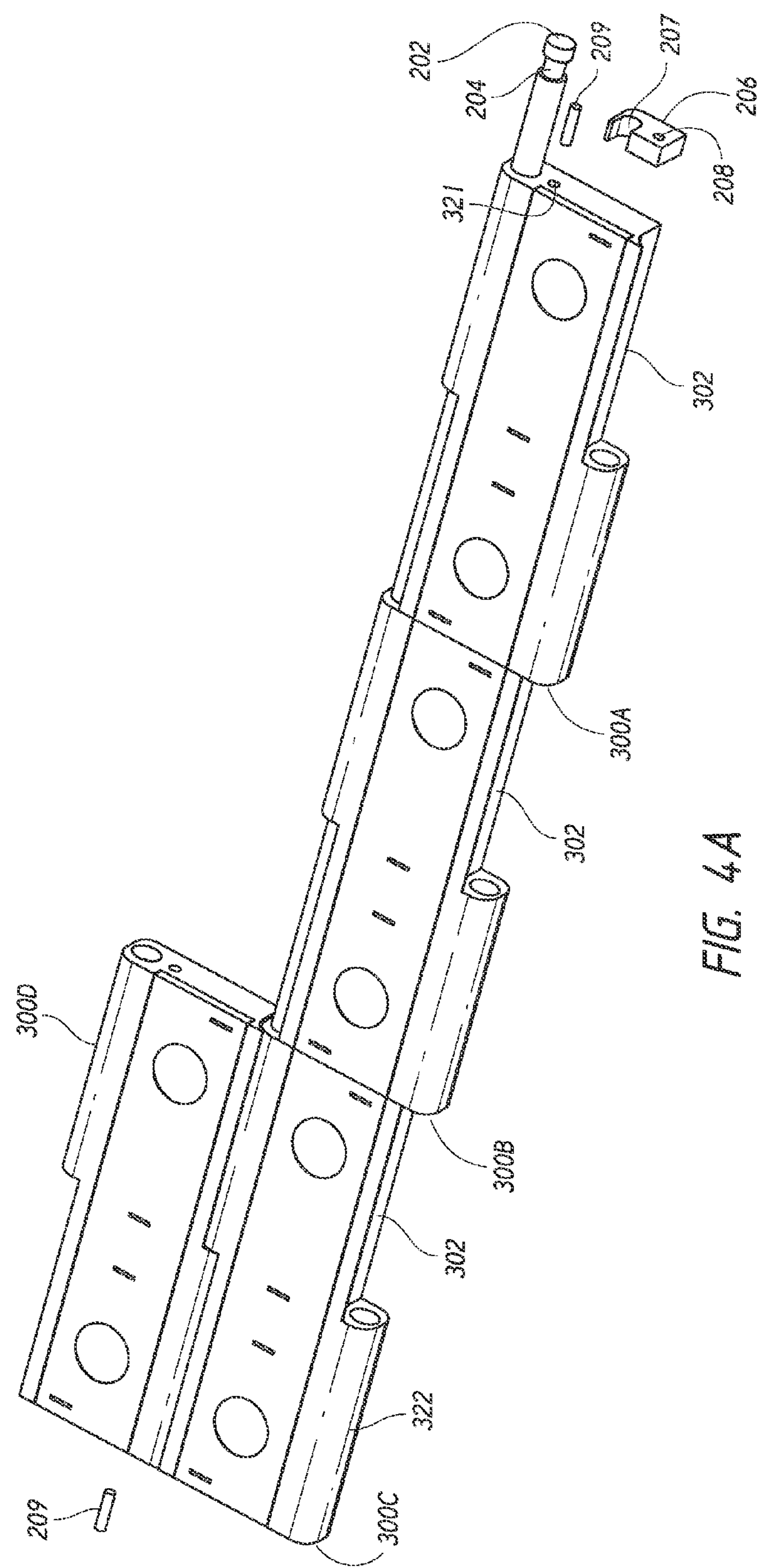
FIGS. 4A and 4B are perspective views of the row of three modules and column of two modules of FIGS. 3A and 3B, with a locking feature such as a clip.
Figure 4B:
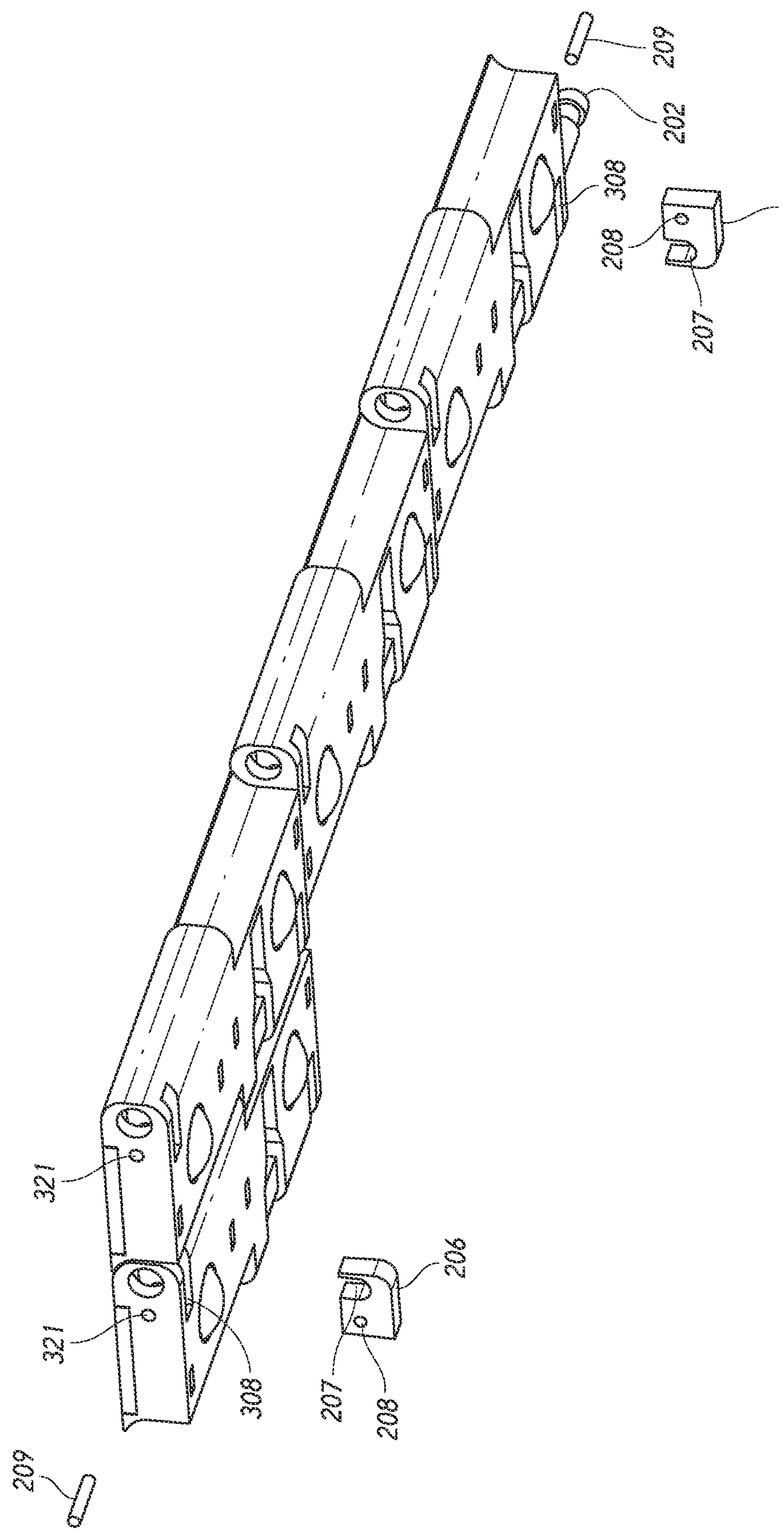

As shown in FIGS. 4A and 4B, in some embodiments, the clip 206 can be secured via a securing feature, such as a rod 209. In certain implementations, the module 300 includes a securing aperture 321 and the clip 206 includes a corresponding aperture 208. According to some variants, when the clip 206 has been received in the recess 308, the apertures 321 are generally aligned, thus allowing the rod 209 to be inserted into the common lumen. The rod 209 can be positioned so as to be received in the module 300 and the clip 206, thereby providing an mechanical interference that inhibits separation of the clip 206 from the module 300. In some embodiments, the securing mechanism comprises a detent, adhesive, or otherwise. In certain variants, the securing mechanism is magnetic (e.g., the clip 206 is magnetically attracted to the retaining pin 202 and/or the module 300).

With reference to FIG. 5A, in some conveyors, the belt modules are arranged in a brick-lay configuration. For example, a module can be position in overlapping alignment with two modules to the front and two modules to the rear, such that one or more lateral boundaries between modules in the same row are offset from and do not line up with one or more lateral boundaries between modules in a consecutive row. In creating a brick-lay design, the use of different types and shapes of modules can be implemented. In contrast, in some embodiments, the modules 300 can be arranged in a columnar manner (e.g., in single file), rather than the previously described brick-lay arrangement. For example, each of the modules 300 can be generally aligned with adjacent modules to the front and the rear. In some embodiments, a generally continuous seam extends along the axis of belt travel and is positioned between adjacent columns of the modules 300.

In some embodiments, in the columnar arrangement 200, 210, the modules 300 can be arranged such that the modules are substantially identical (e.g., in overall shape, dimensions, material, and/or otherwise), and the lateral boundaries between them in consecutive rows are not offset and generally line up with each other. In some embodiments, the series design 200, 210 can, for example, reduce cost and facilitate manufacturability (e.g., by the use of a single mold design), ease assembly of the modular conveyor belt by simplifying the arrangement, reduce the total number of parts, and reduce the number of different parts that need to be stocked as spares.

In some embodiments, the modular nature of the conveyor design allows mixing and matching of different conveyor patterns. For instance, in certain implementations brick-lay configurations and columnar configurations can be used together. As previously described, the modules 300 can be arranged in rows and can be maintained in such rows by the retaining pins 202.

Figure 5B:
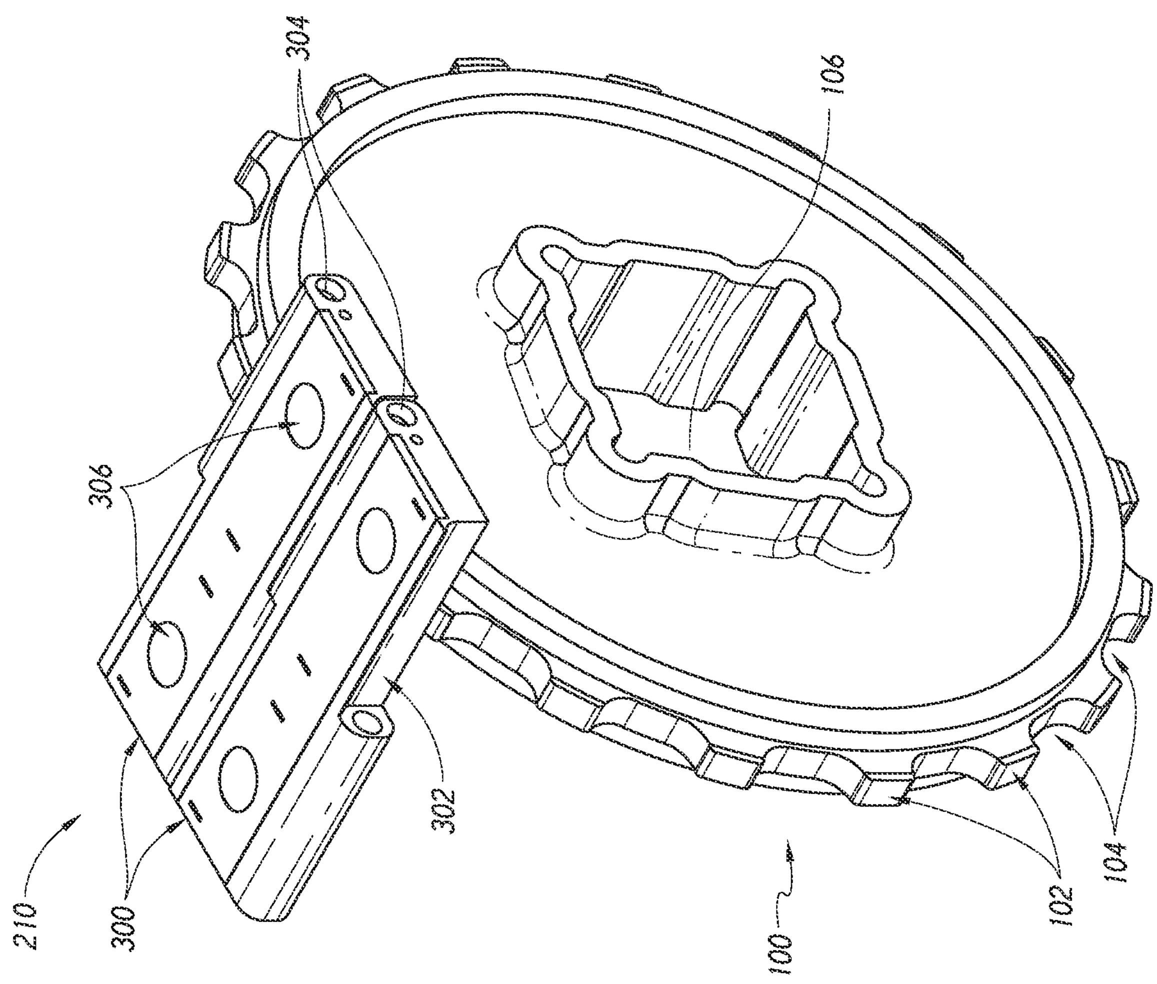
FIG. 5B is a perspective drawing of a single column of a conveyor system in contact with a sprocket.

In some embodiments, such as is illustrated in FIG. 5B, the modular conveyor 200 can be one module 300 wide. In some embodiments, the modules 300 are arranged in a columnar manner, but not in rows. As shown in FIG. 5B, in some implementations, the modules 300 of the modular conveyor 200 abut with and/or connect with (e.g., via the pin 202) modules along the axis of belt travel, but do not abut with and/or connect to modules laterally.

Figure 6:
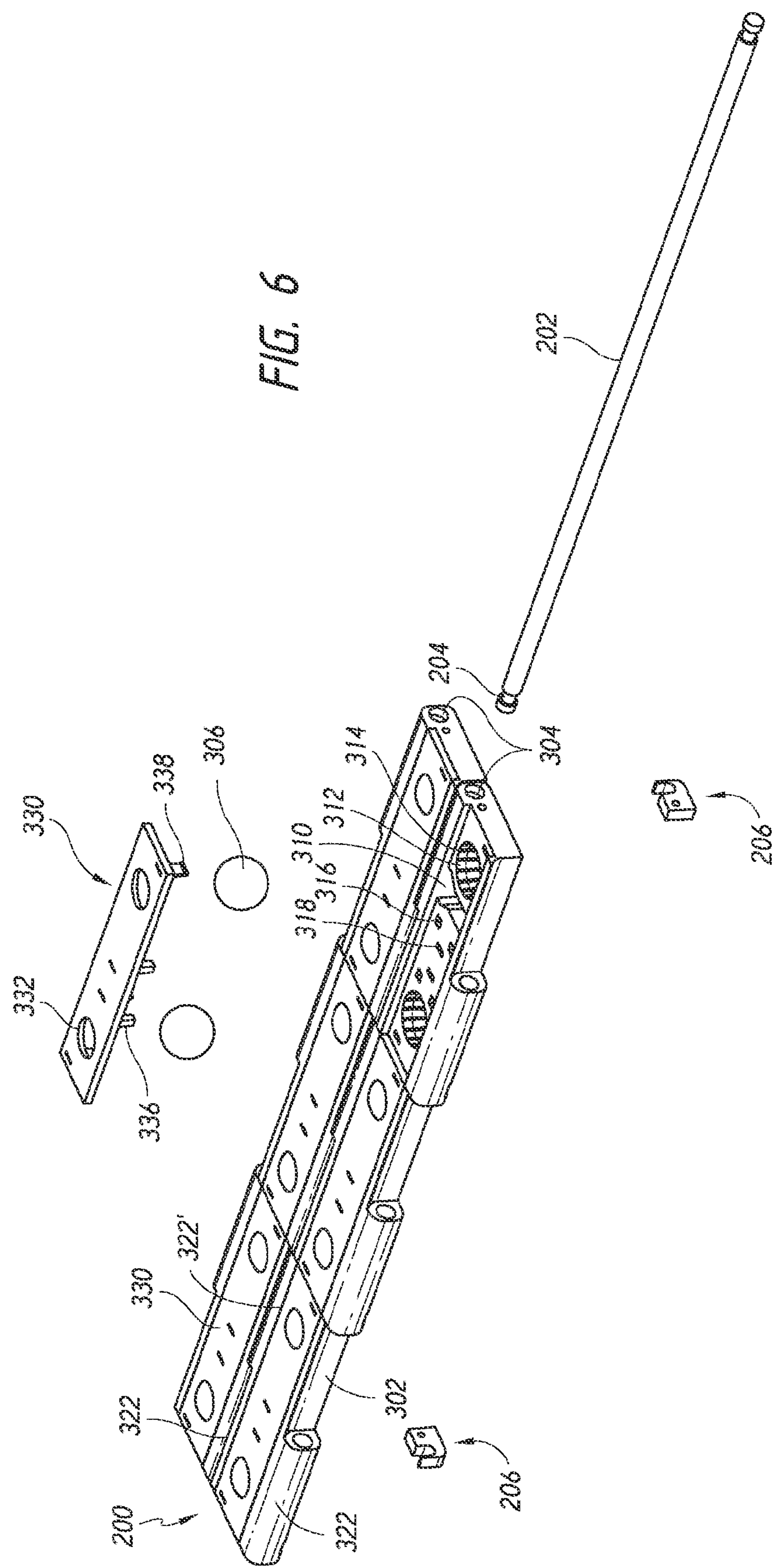
FIG. 6 is a partial exploded and perspective view of two rows of modules and three columns of modules and a retaining pin.
Figure 7A:
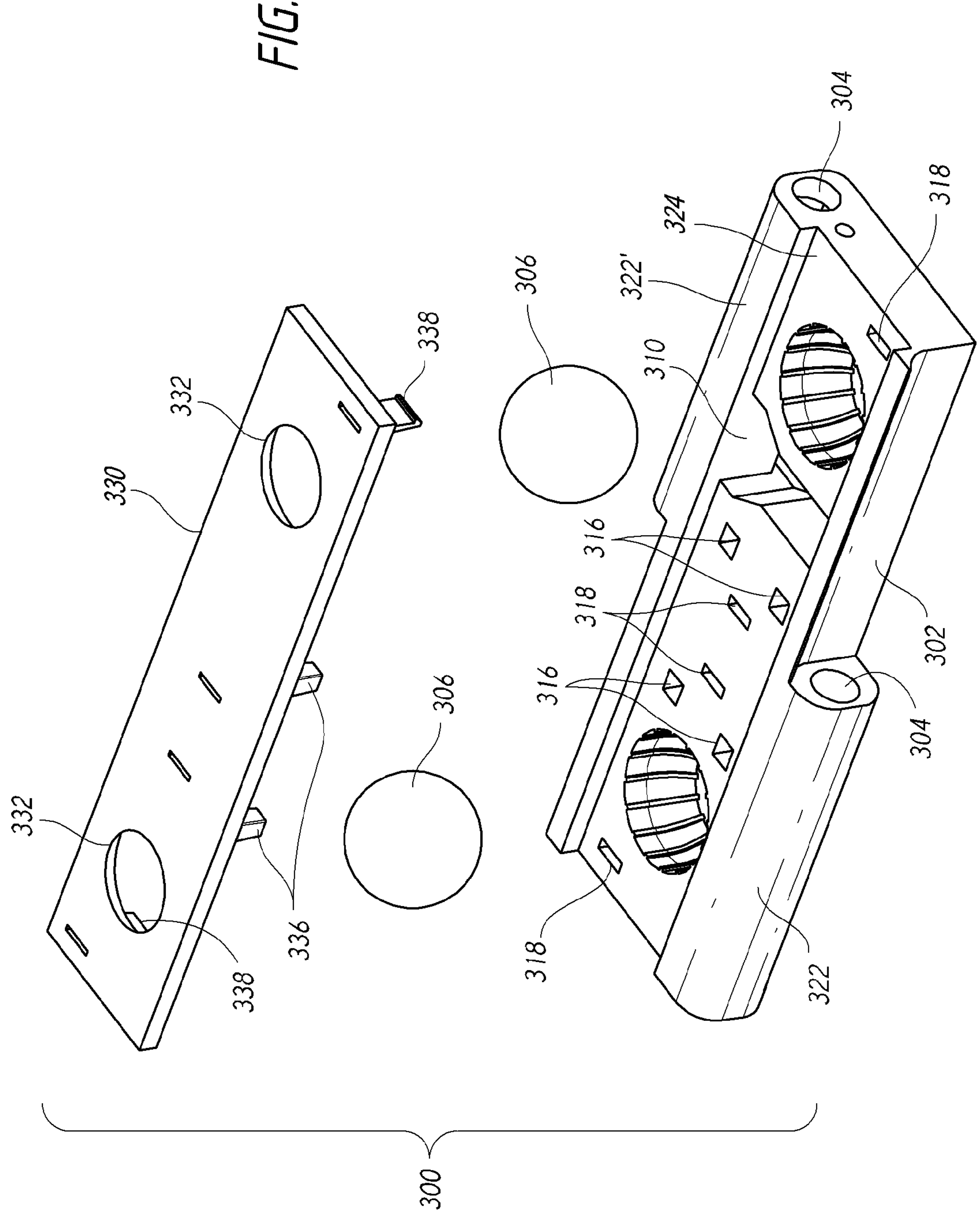
FIG. 7A is an exploded top view of one of the modules of FIG. 6.
Figure 7B:
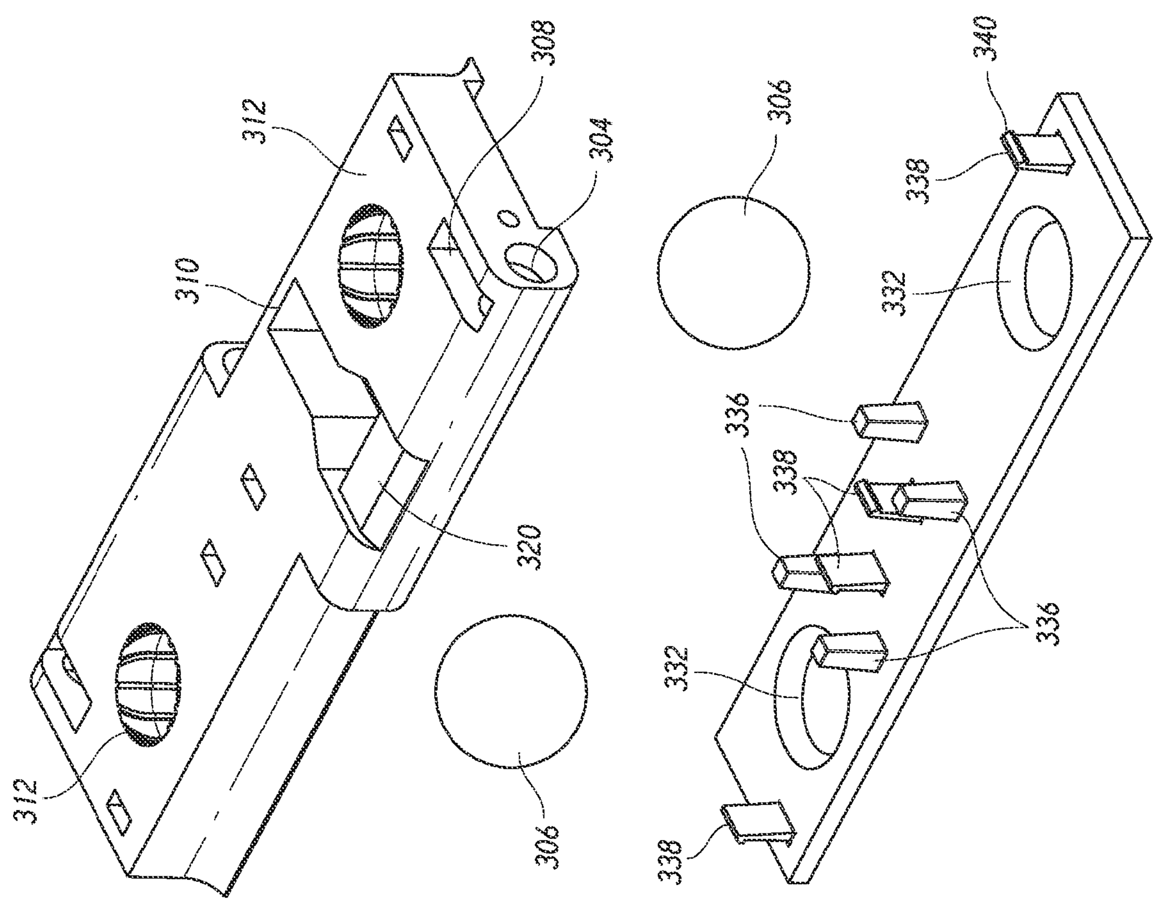
FIG. 7B is an exploded bottom view of the module of FIG. 7A.
Figure 7C:
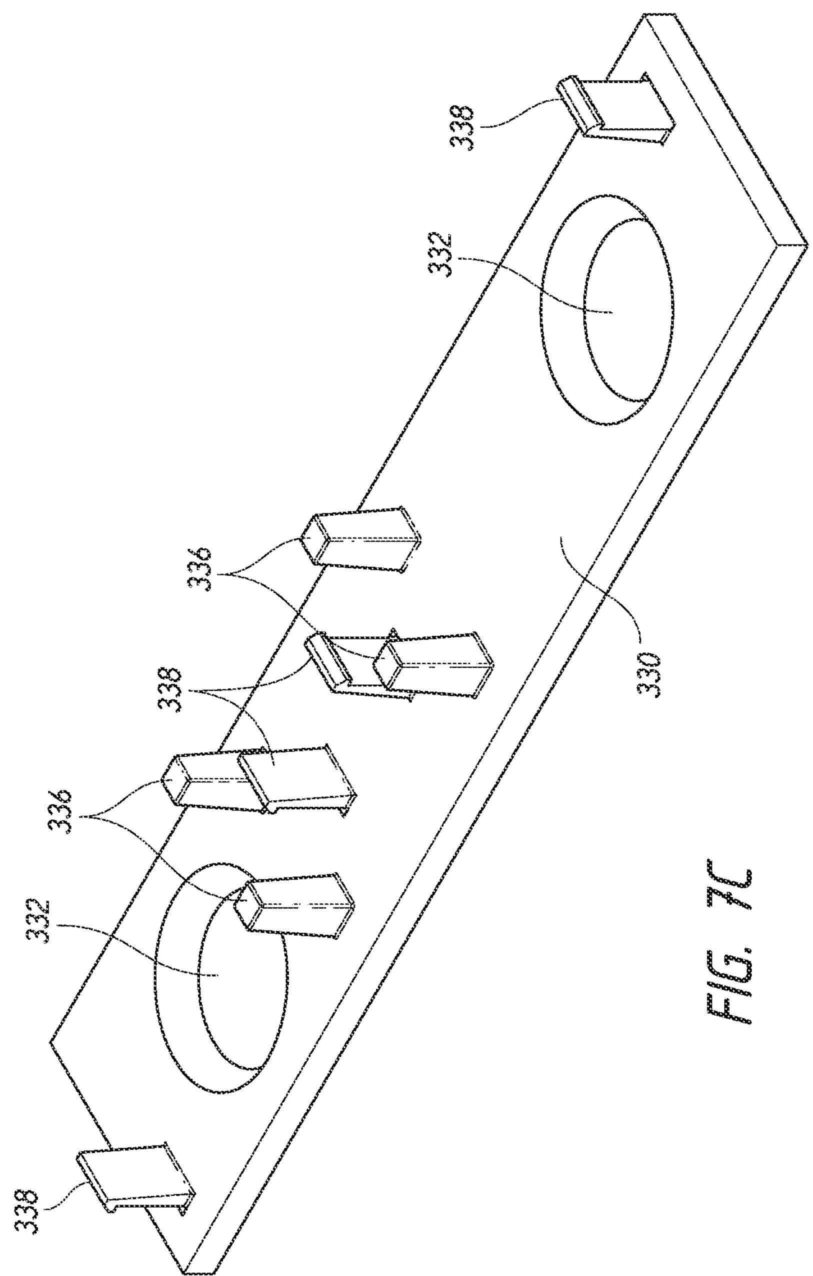
FIG. 7C is a bottom view of the upper member of the module of FIG. 7A.
Figure 8A:
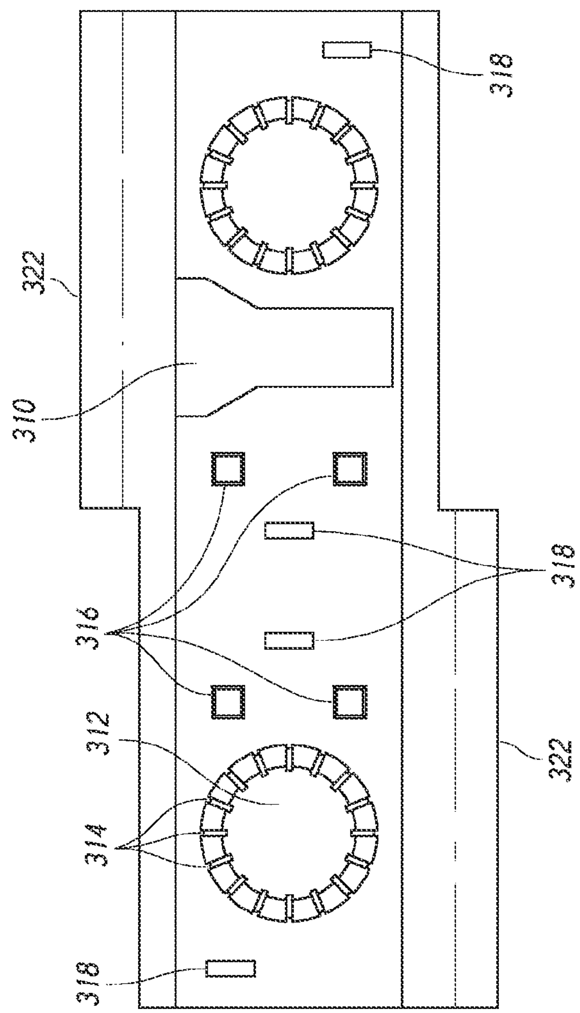
FIG. 8A is a top view of the module of FIG. 7A with the upper member not shown.
Figure 8B:
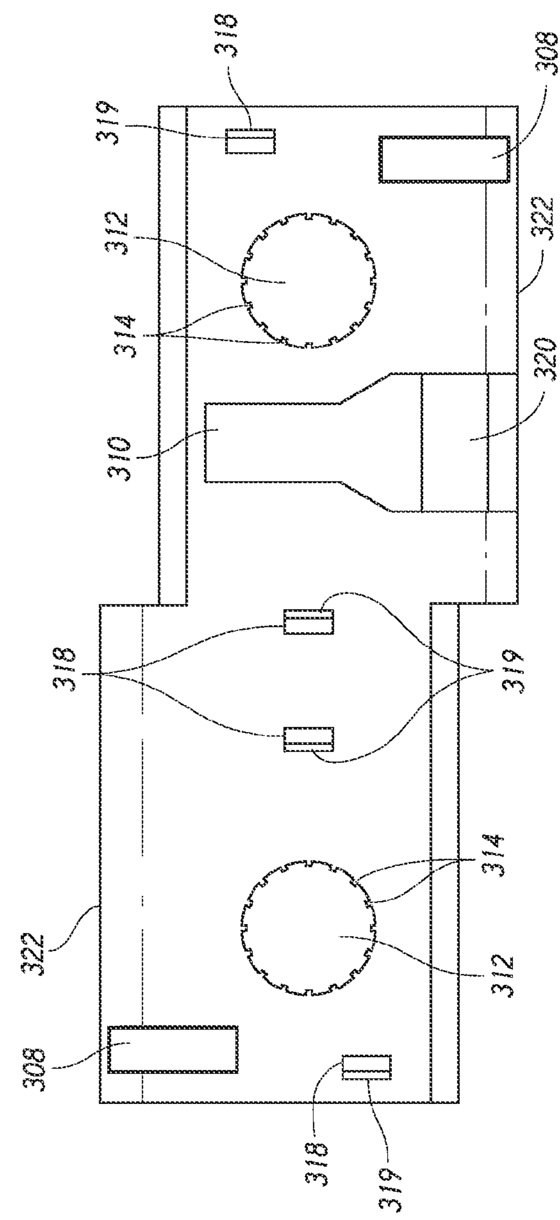
FIG. 8B is a bottom view of the module of FIG. 8A.

As shown in FIGS. 6 and 7A (and also seen in FIGS. 3A and 4A), the modules 300 can include legs 322, 322' that extend from each of the front and rear of the modules 300. The legs 322, 322' can each include the passage 304. In some embodiments, the modules 300 include only a single leg 322 and only a single leg 322'. Such a configuration can, for example, enhance the strength and/or stability of the conveyor 200. In some embodiments, each of the legs is configured to engage with a single opposite leg from an adjacent module. For example, the leg 322 from a first module can be configured to engage with the leg 322' from a module that is adjacent along the axis of belt travel. In certain variants, when the legs 322, 322' mate, the respective passages 304 in the legs 322, 322' generally align, thereby allowing the retaining pin 202 to pass between, and connect, the front-to-back adjacent modules 300.

In some embodiments, at least one of the legs 322, 322' extends laterally a substantial portion of the width of the module 300. In some embodiments, the legs 322, 322' each extend from a lateral side to about the lateral centerline (e.g., parallel to the axis of belt travel) of the module 300. In certain variants, the legs 322, 322' each extend at least about 40% and/or less than or equal to about 49% of the lateral width of the modules 300.

With reference to FIGS. 7A-8B, the modules 300 can include an upper member 330 (e.g., a cover, plate, cap, or otherwise) that is configured to couple with the body 302. In certain implementations, the upper member 330 extends the entire or substantially the entire width of the module 300, as defined by the distance between the lateral sides of the module 300. As illustrated (and also as shown in FIGS. 16A-19B, discussed in more detail below), in some embodiments, the upper member 330 generally spans and/or covers at least a majority of the width of the body 302. In some embodiments, the width of the upper member 330 is defined as a ratio of the width of the module 300. In certain implementations, the ratio of the width of the upper member 330 to the width of the module is about: 1:1, 95:100, 90:100, 80:100, 70:100, 60:100, 50:100, 40:100, 30:100, 20:100, 10:100, ratios in between the aforementioned ratios, and otherwise.

As shown, the body 302 can include an attachment portion, which can be configured to receive the upper member 330. For example, in some embodiments, the body 302 includes a recessed portion and/or a channel 324 that is configured to receive some or all of the upper member 330. In certain variants, certain sides of the channel 324 are bounded by upwardly extending rail portions, such as is shown in FIG. 7A. In certain embodiments, the top surface of the upper member 330 is generally flush with a top or top-most surface of a portion of the body 302. In some embodiments, the engagement of the module body 302 and module upper member 330 can enhance the rigidity and/or strength of the modules 300, and thus the modular conveyor 200. In some embodiments, the thickness (e.g., between the top and bottom surfaces) of the upper member 330 is less than or equal to about 25% of the thickness of the module 300. In certain embodiments, the thickness of the upper member 330 is less than or about equal to the thickness of the module, such has less than or or equal to about 10%, about 15%, about 20%, about 25%, about 30%, or about 35% of the thickness of the module (and values in between the aforementioned values, and otherwise). In certain implementations, the module body 302 and module upper member 330 are configured to secure the rolling element 306 in the modules 300, as will be discussed in more detail below. In some embodiments, as illustrated, the upper member is not an annular member, such as a retainer ring.

In some embodiments, the body 302 can include one or more securing features (e.g. securing holes 318) that are configured to engage corresponding securing features (e.g. securing members 338), such as ribs, posts, or otherwise, of the module upper member 330 to secure the upper member 330 with respect to the body 302. In certain variants, the securing holes 318 are positioned in the upper surface of the body and include a recessed area and a cantilever. In some implementations, the securing members 338 extend from a bottom surface of the upper member 330. Some embodiments of the securing members 338 include a locking feature (e.g., a lip) that is configured to engage with the cantilever, such as by a snap fit. In certain embodiments, when the securing members 338 are engaged with the securing holes 318, the upper member 330 is inhibited from being separated from the body 302. In various embodiments, the module upper member is not connected to a seat 312 in which the roller members (e.g., balls) reside, which is discussed in further detail below. In some implementations, the body 302 includes the securing member 338 and the upper member 330 includes the securing hole 318.

In some implementations, the module body 302 can include one or more alignment features (e.g. alignment holes 316) that are configured to engage corresponding alignment features (e.g. guide members 336) of the upper member 330. In some implementations, the guide members 336 are configured to engage the alignment holes 316 prior to the securing members 338 engaging the securing holes 318. For example, the guide members 336 can be longer than (e.g., extend further below the bottom surface of the upper member 330) the securing members 338. In some embodiments, the guide members 336 are configured to position and/or orient the upper member 330 relative to the body. For example, in some variants, the guide members 336 are at least partially tapered so that the distal end of the guide members 336 has a smaller cross-sectional area than the opposite end of the guide members 336. In some implementations, positioning and/or orienting of the upper member 330 facilitates alignment of the securing members 338 and the securing holes 318.

As noted above, the module body 302 and upper member 330 can be configured to secure the rolling element 306 in the modules 300. As illustrated, the body rolling element 306 can be positioned in a seat 312 (e.g., a recess, hollow, groove, or otherwise) in the body 302. In certain variants, an upper portion of the rolling element 306 can extend through an upper roller opening 332 in the upper member 330. In some embodiments, a bottom portion of the rolling element 306 can extend through a bottom roller opening in the body 302. In certain embodiments, the upper portion of the rolling element 306 extends above the top surface of the upper member 330, thus allowing goods positioned on the top of the modules 300 to roll on the rolling element 306.

In some embodiments, the bottom portion of the rolling element 306 extends below the bottom surface of the body 302. This can allow the bottom portion of the rolling element 306 to be engaged with a surface below the rolling element 306, such as a surface that is stationary or otherwise moving at a different velocity than the modular conveyor 200. This configuration can allow for rotation of the rolling elements 306 (e.g., in the direction of belt travel, opposite the direction of belt travel, or at an angle with respect to the direct of belt travel), which can result in a change in the speed or direction of goods on the top of the modular conveyor 200. Such a design can, for example, facilitate sorting of goods, accelerating goods along the conveyor 200, and/or stopping or reversing the movement of goods in comparison to the movement of the conveyor 200. In certain embodiments, the rolling element extends above the top surface of the upper member 330 more than the rolling element extends below the bottom surface of the body 302. For example, the distance that the rolling element 306 extends above the top surface of the upper member 330 can be at least about 10% more than the distance that the rolling element 306 extends below the bottom surface of the body 302.

In some embodiments, the seat 312 includes friction reducing elements, such as ribs 314. In some embodiments, the ribs 314 aid in the movement of the rolling element 306 by reducing the contact area between the rolling element 306 and the module body 302. In some embodiments, the ribs 314 provide a pathway for debris to exit from the seat 312 and/or from the top of the module (e.g., through the top opening 332, around the rolling element 306 between the ribs 314, and exit out of the bottom opening). By allowing a pathway for debris to exit, damage (e.g., by abrasion) to the rolling element 306, module body 302, and/or module upper member 330 can be better reduced or inhibited.

With regard to FIGS. 9-15B, another embodiment of a modular conveyor 220 is illustrated. In some embodiments, the conveyor system 220 includes a rotational-interlock mechanism that can provide lateral connection between laterally adjacent modules, as will be discussed in further detail below. In certain embodiments, the conveyor 220 can include a male module 400A and female module 400B. The modules 400A, 400B can each be similar, or identical, to the module 300 described above in some ways, yet can differ in certain respects, some of which are discussed below.

In certain embodiments, the male module 400A can include a body 402A, passages 404A, rolling element 406 (e.g., spherical ball), a sprocket recess 410A, a seat 412A, and ribs 414A. Certain embodiments include alignment holes 416A, securing holes 418A, a sprocket recess step 420A, and a leg 422A. In some implementations, the female module 400B includes a body 402B, passages 404B, rolling elements 406, a sprocket recess 410B, a seat 412B, ribs 414B, alignment holes 416B, securing holes 418B, a sprocket recess step 420B, and a leg 422B. The modules 400A and 400B can each include module upper members 440, which can include openings 442, guide members 446, and securing members 448. In some implementations, the securing members 448 include projections, such as lips 450, that are configured to engage (e.g., be deflected by and/or snappedly received in) the securing holes 418A, 418B. In some embodiments, as illustrated or as described herein, the engagement of the module body 402A, 402B and module upper member 440 can enhance the rigidity and/or strength of the modules, and thus the modular conveyor.

Figure 9:
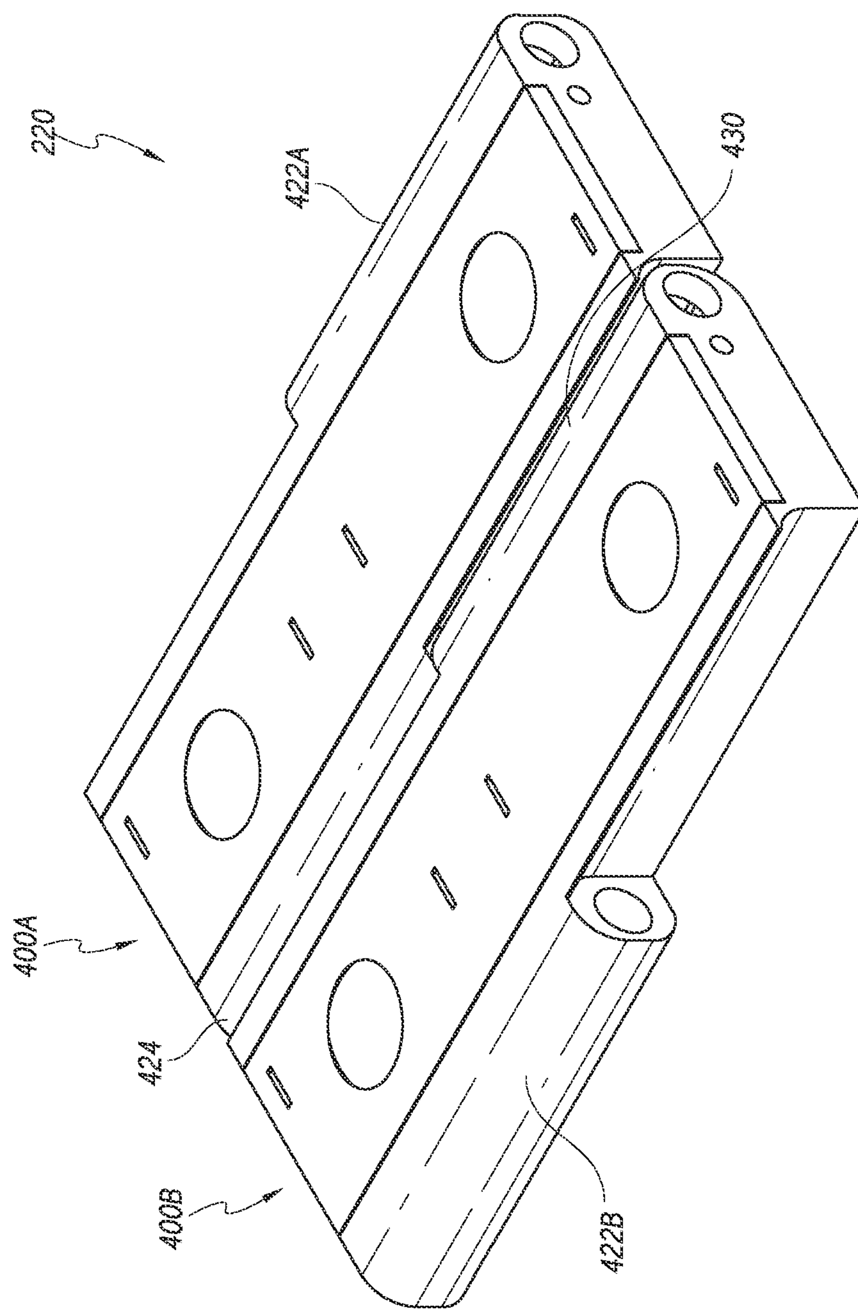
FIG. 9 is a perspective view of another embodiment of a modular conveyor having engagable male and female modules.
Figure 10A:
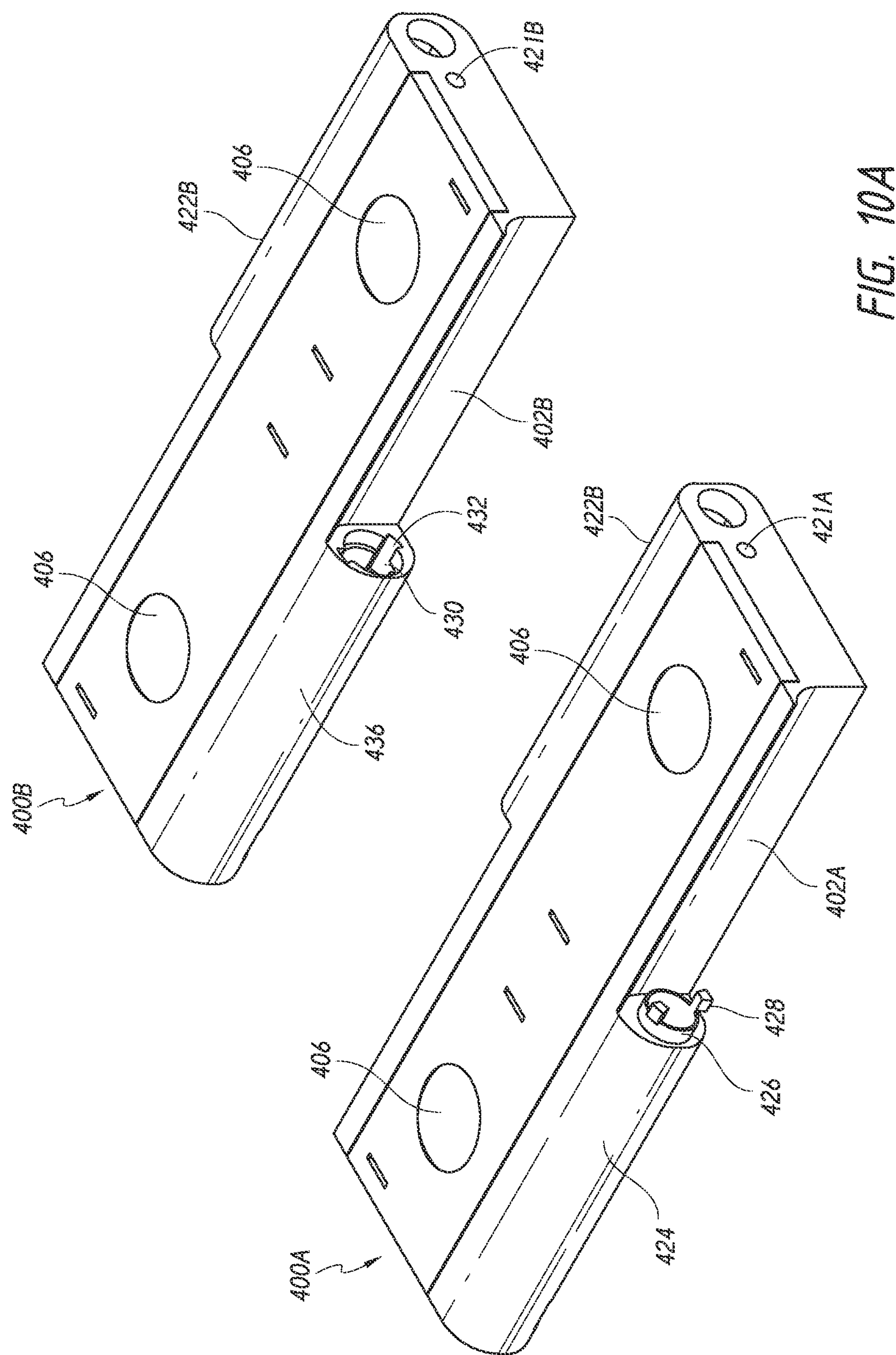
FIG. 10A is a partially exploded and perspective view of the modules of FIG. 9.
Figure 10B:
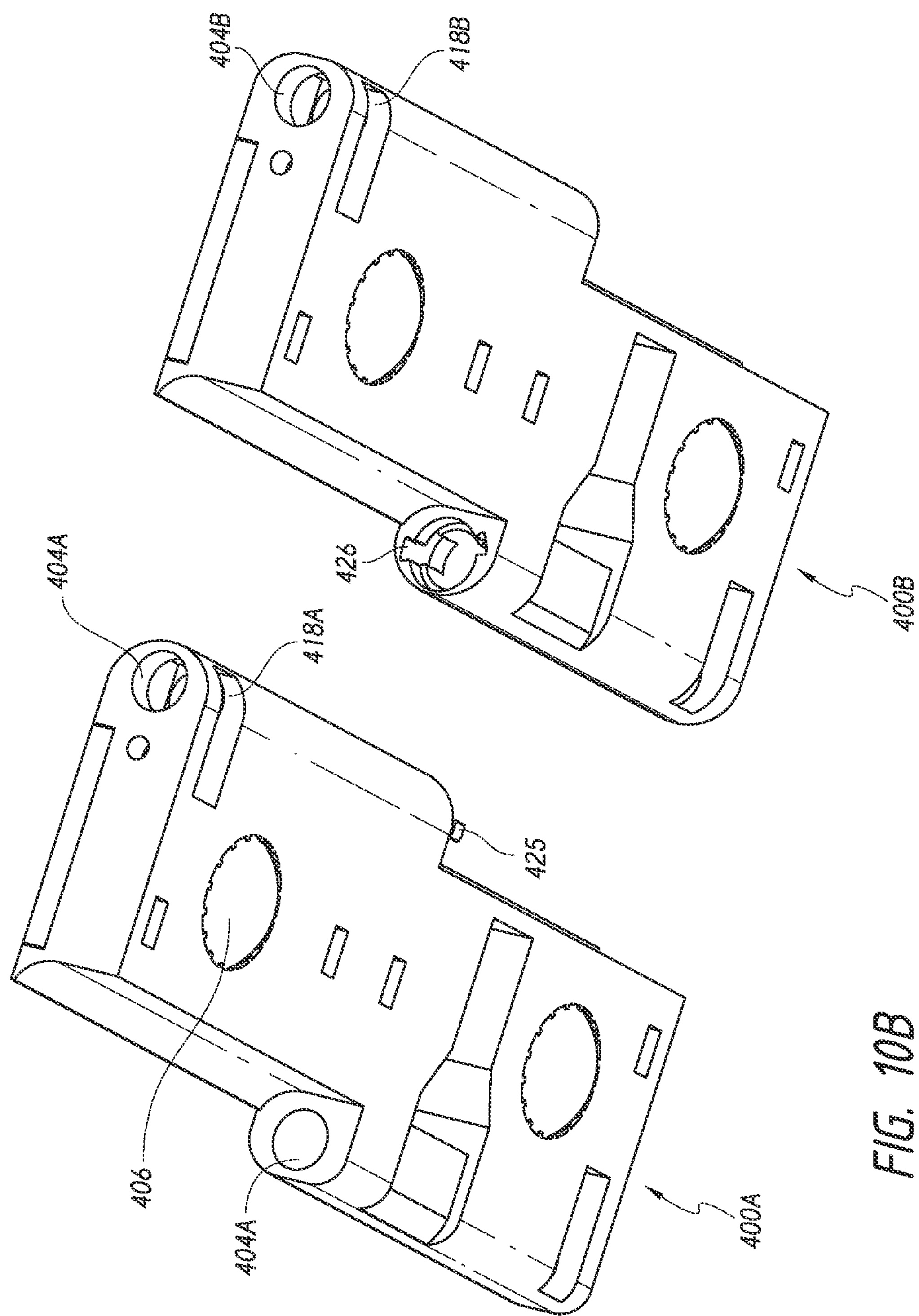
FIG. 10B is a bottom view of the modules of FIG. 10A.
Figure 11A:
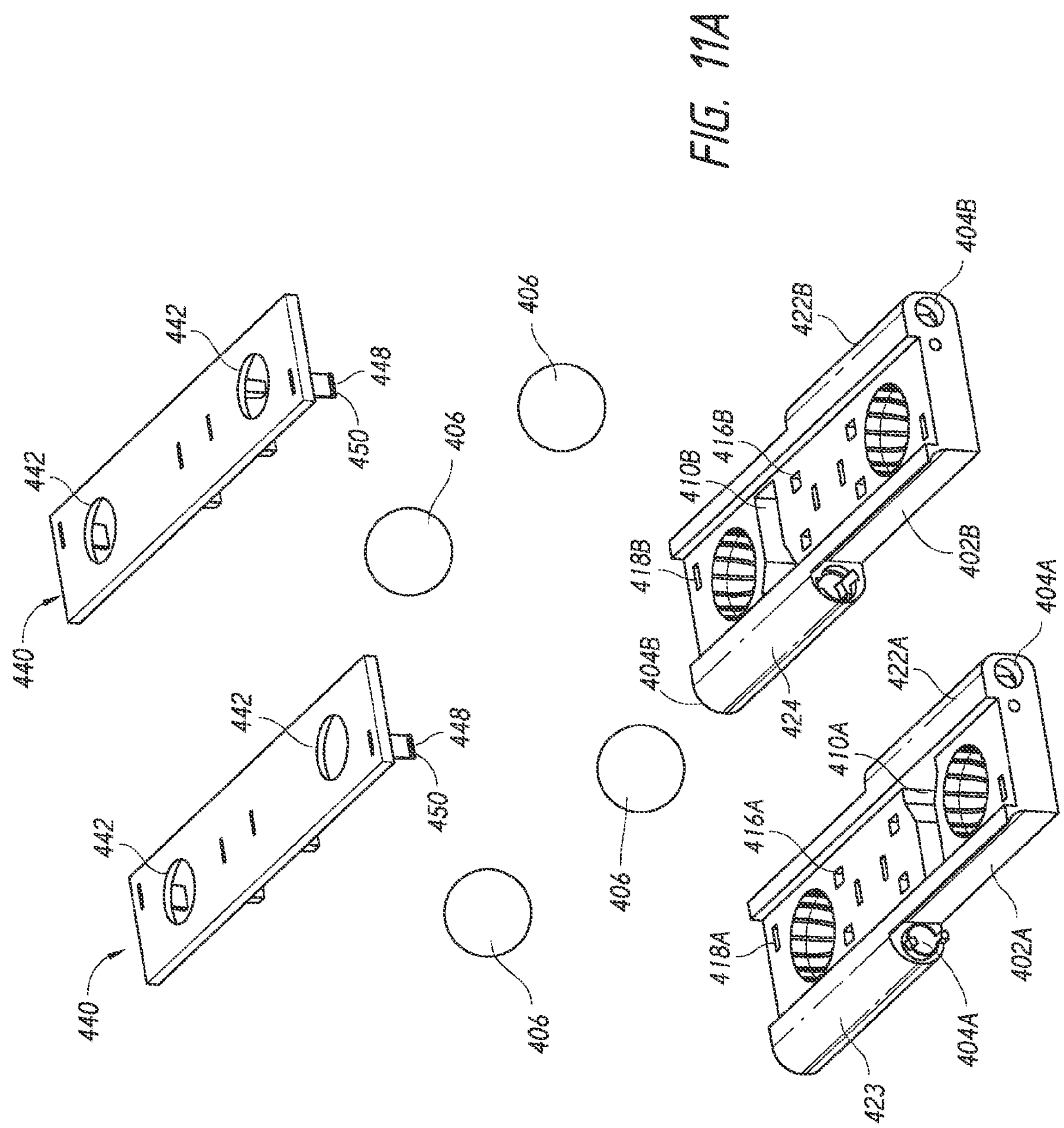
FIG. 11A is an exploded top view of the modules of FIG. 10A.
Figure 11B:
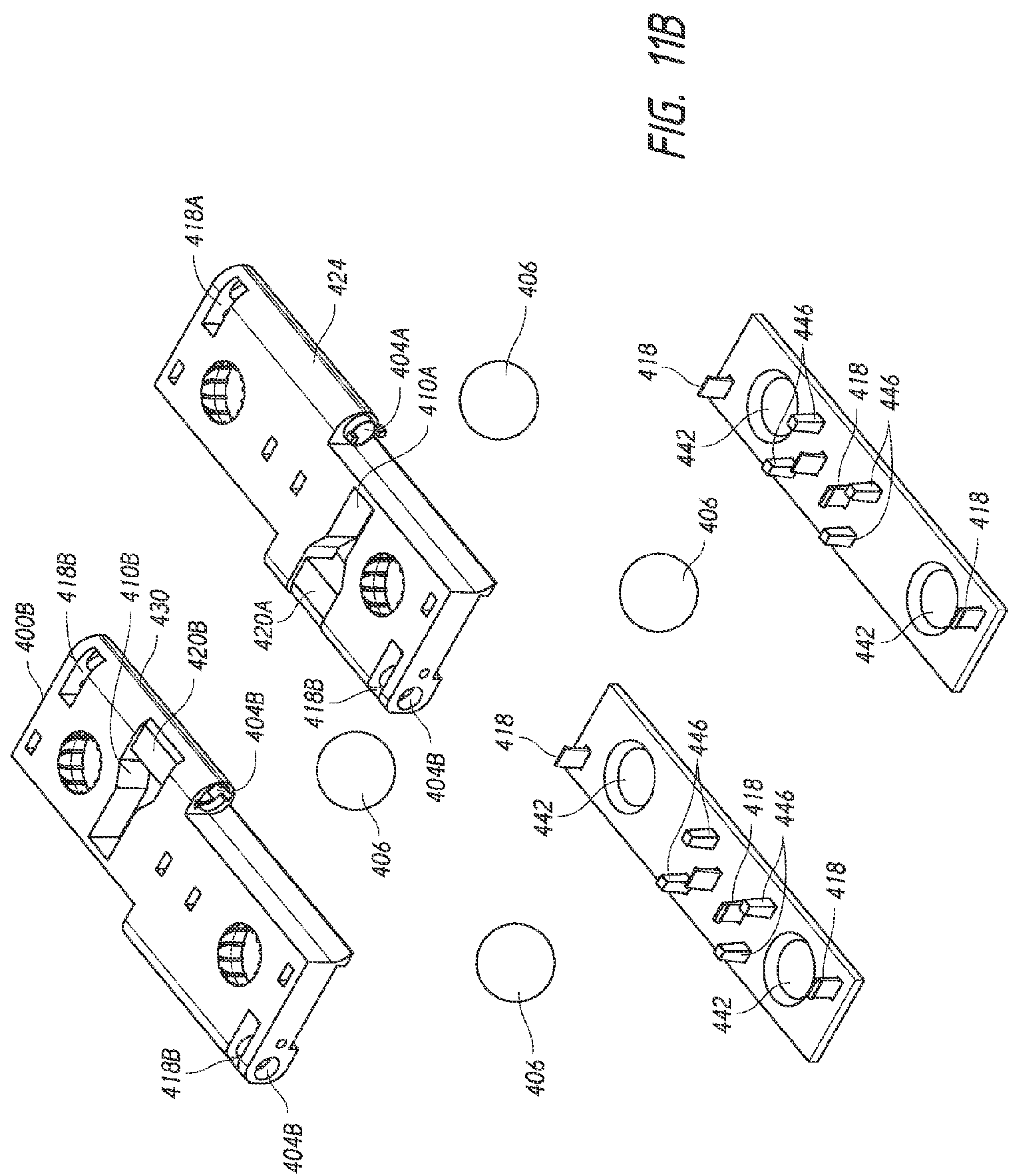
FIG. 11B is an exploded bottom view of the modules of FIG. 10A.
Figure 13:
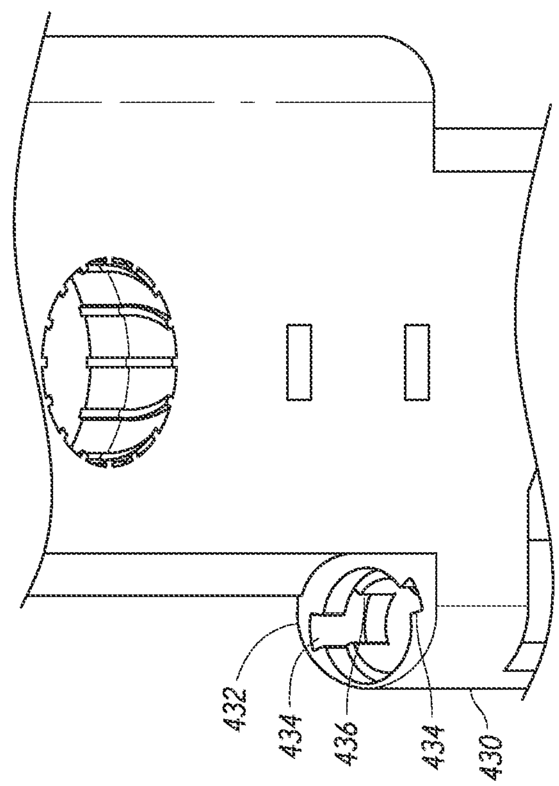
FIG. 13 is a close-up bottom view of a female rotational-interlock mechanism of the female module of FIG. 9.
Figure 12:
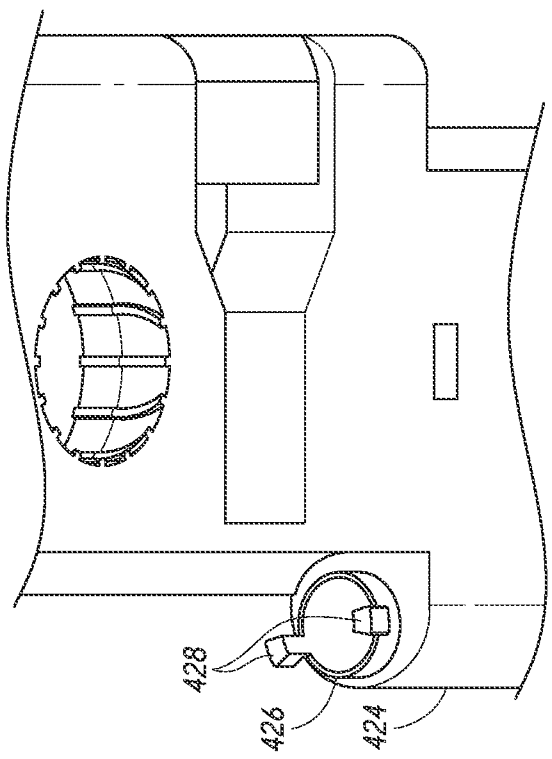
FIG. 12 is a close-up bottom view of a male rotational-interlock mechanism of the male module of FIG. 9.

In some embodiments, the male module 400A and female module 400B can engage. For example, as shown in FIG. 9, the legs 423, 430 can engage so as to generally align the passages 404A, 404B, thus allowing a retaining pin (not shown) to be received therein. In some embodiments, the male module 400A has a male leg 424. In some embodiments, the female module 400B has a female leg 430. In some embodiments, the male leg 424 of the male module 400A is configured to insert into the female leg 430 of the female module 400B. For example, the male leg 424 can be rotatably and/or laterally received in the female leg 430.

In some embodiments, as shown for example in FIGS. 10-13, the male leg 424 has projections 426, such as a tubular extension. The projections 426 can be configured to be received in the female leg 430 of the female module 400B. In some embodiments, the male projection 426 includes rotational securing members, such as fingers 428. The fingers 428 can be configured to enter corresponding rotational securing recesses 432 of the female module 400B, as will be described in further detail below.

In certain variants, the male leg 424 can be configured to engage the female leg 430 when the male leg 423 is rotated relative to the female leg 430. In some embodiments, as shown in FIGS. 14A and 14B, the conveyor 200 can be configured so that the male module 400A can be laterally inserted into the female module 400B when the male module 400A is positioned at an angle α, at which the male fingers 428 are generally aligned with the rotational securing recesses 432. In some embodiments, the angle α is at least about 100° and/or less than or equal to about 175°. In some embodiments, the angle α is less than or equal to about: 90°, 120°, 135°, 150°, values at these points or in between these points, or otherwise. In certain variants, the angle α is less than the angle through which the modules 400A, 400B rotate relative to each other when the modules 400A, 400B move about the sprocket 100.

In some variants, the modules 400A, 400B can be configured so that the engagement of the male leg 424 and the female leg 430 occurs in the direction opposite to that experienced by the modules 400A, 400B during operation of the conveyor belt. For instance, the male leg 424 and female leg 430 can be configured to engage and disengage the female module 400B, respectively, by moving the female module 400B counterclockwise relative to the male module 400A. Modules with this engagement direction can then be used on a conveyor system that moves the female module 400B in a clockwise direction relative to the male module 400A during operation.

Figure 14:
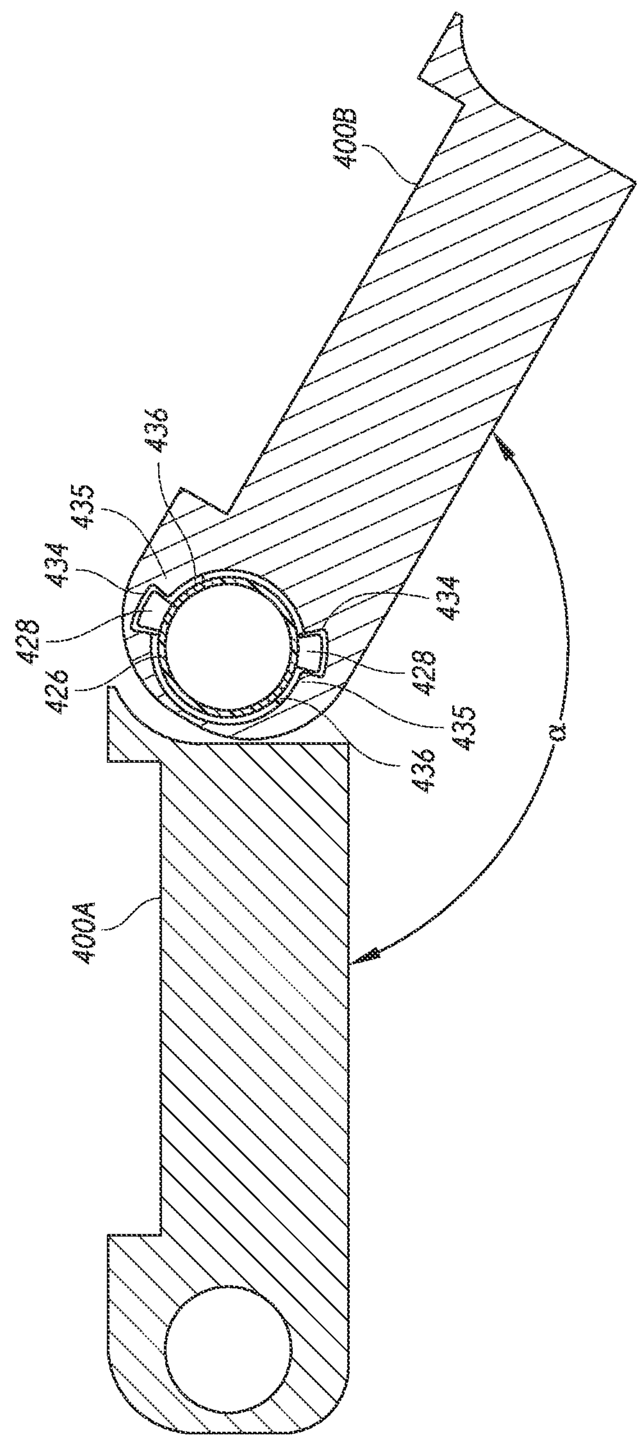
FIG. 14 is a cross-sectional side view of an embodiment of a male module engaging a female module in a first position.
Figure 15:
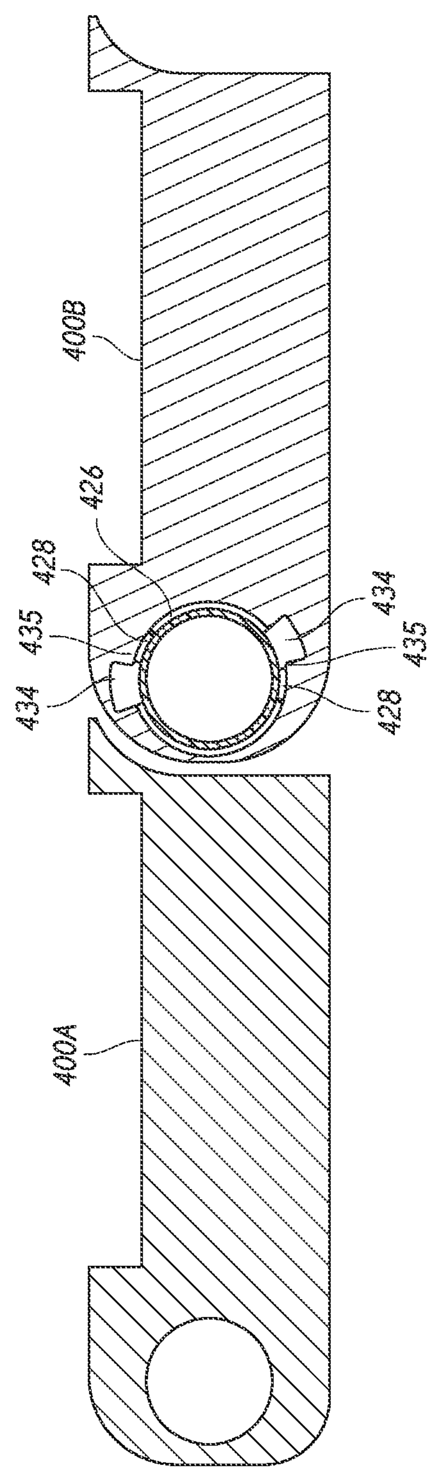
FIG. 15 is a cross-sectional side view of the male and female modules of FIG. 14 engaged in a second position.
Figure 16A:
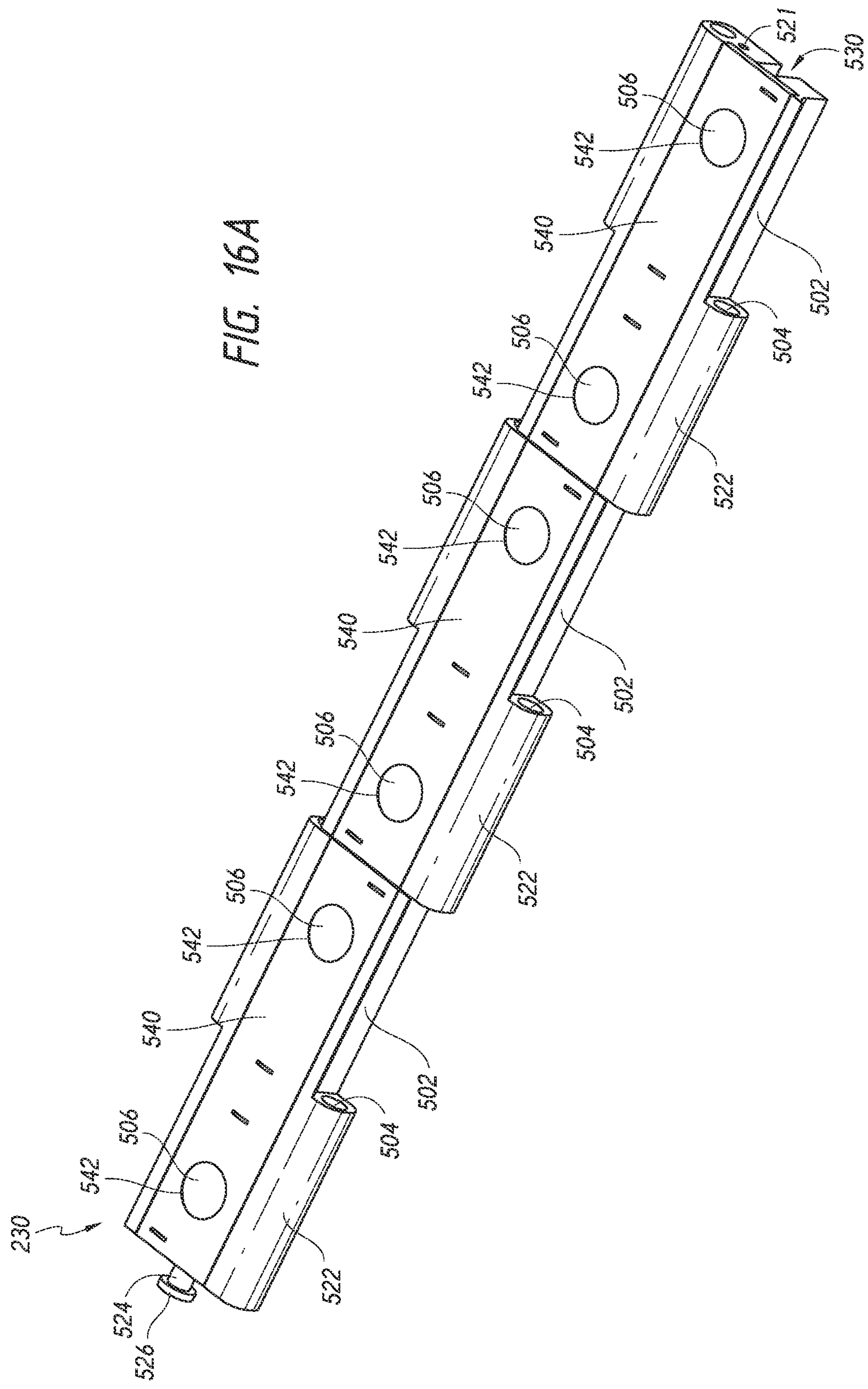
FIG. 16A is a top perspective view of another embodiment of a modular conveyor system.
Figure 16B:
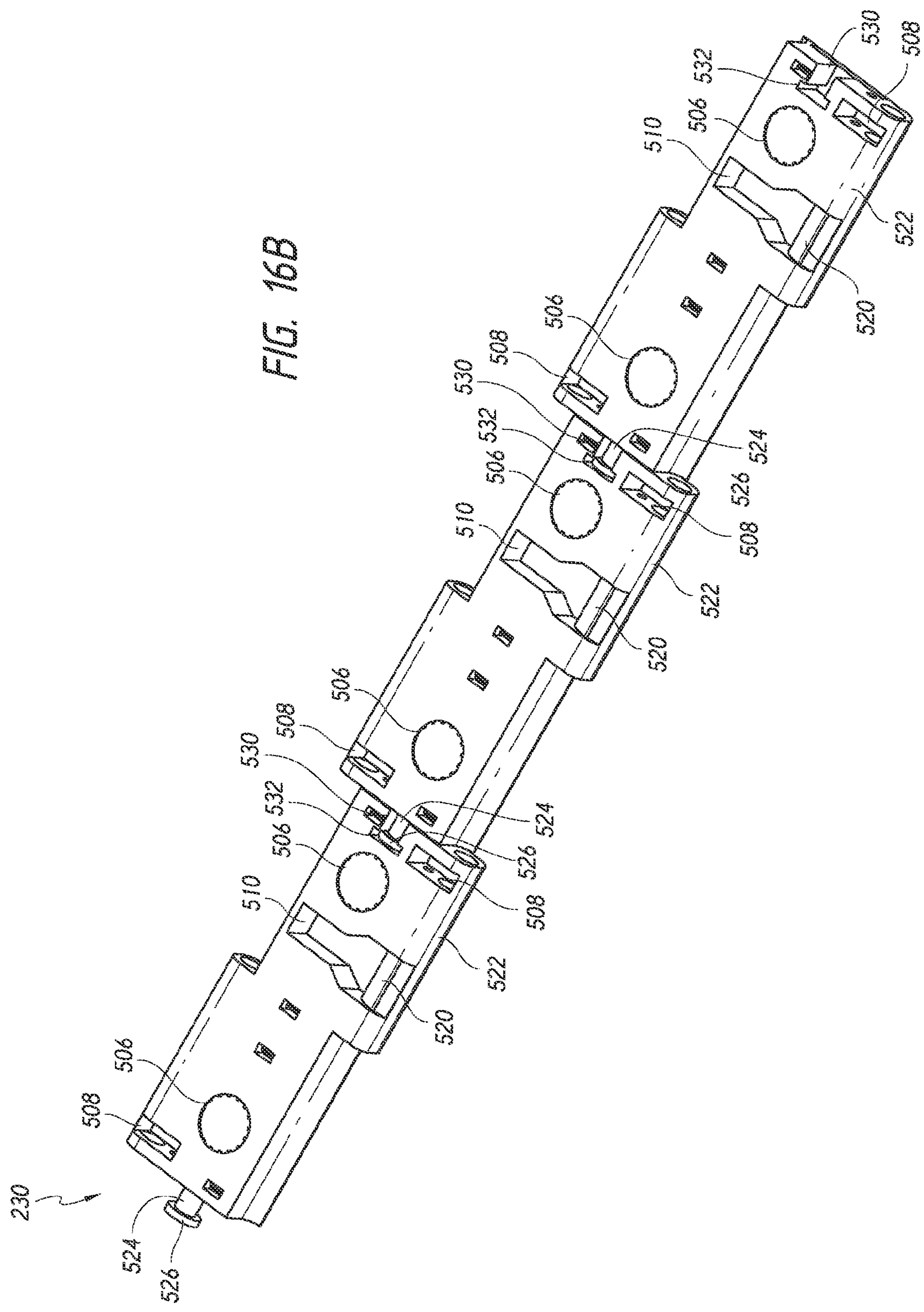
FIG. 16B is a bottom perspective view of the conveyor system of FIG. 16A.
Figure 17A:
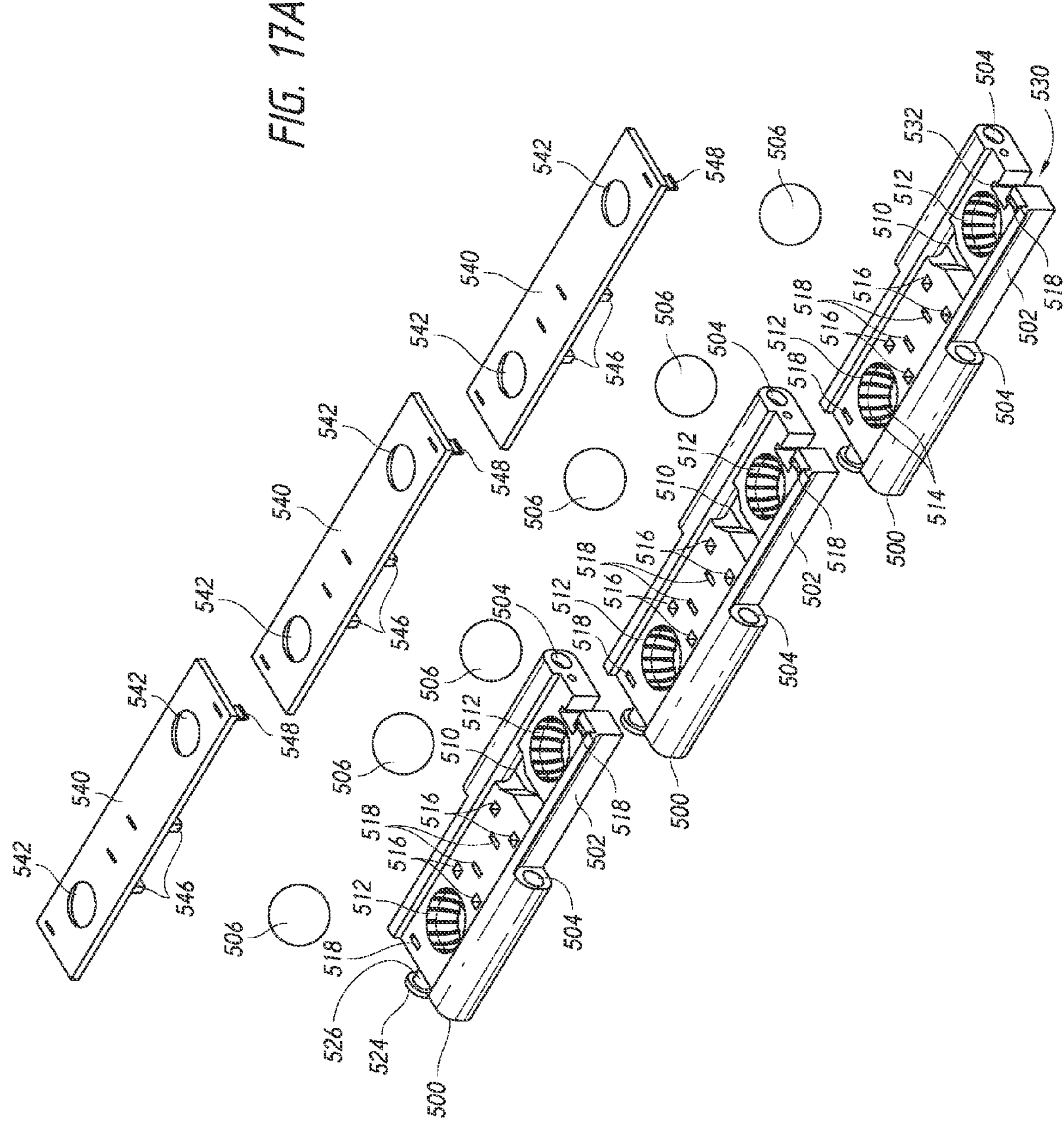
FIG. 17A is an exploded top perspective view of the conveyor system of FIG. 16A.
Figure 17B:
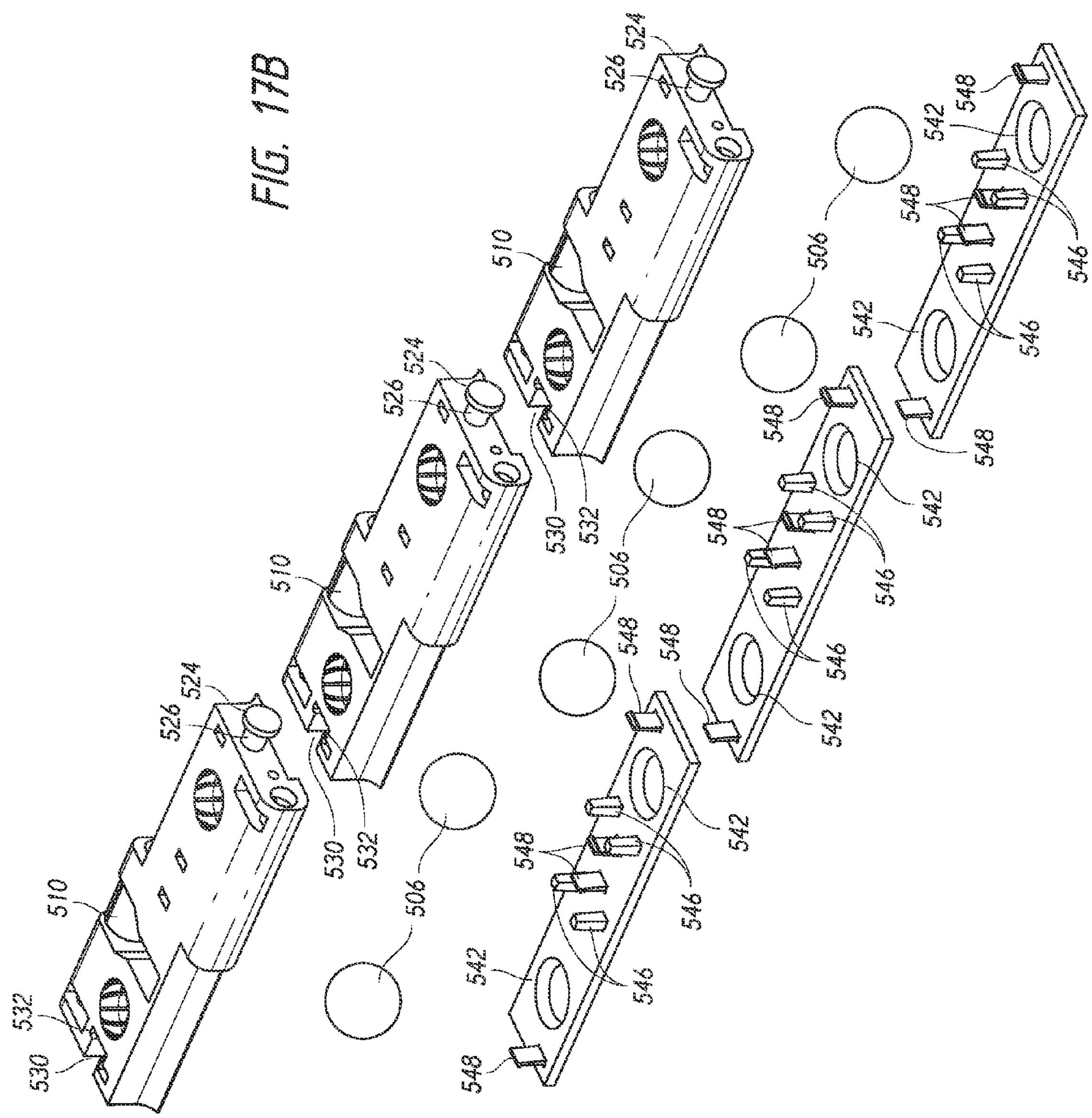
FIG. 17B is an exploded bottom perspective view of the conveyor system of FIG. 16A.
Figure 18:
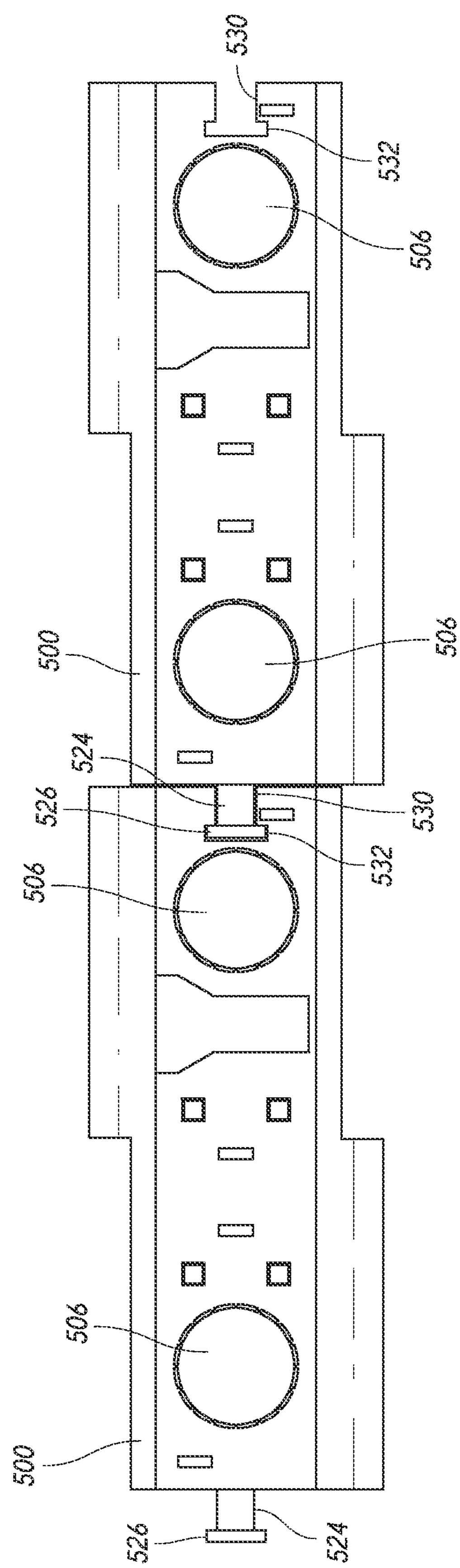
FIG. 18 is a top view of two modules of the conveyor system of FIG. 16A with the module upper members not shown.
Figure 19A:
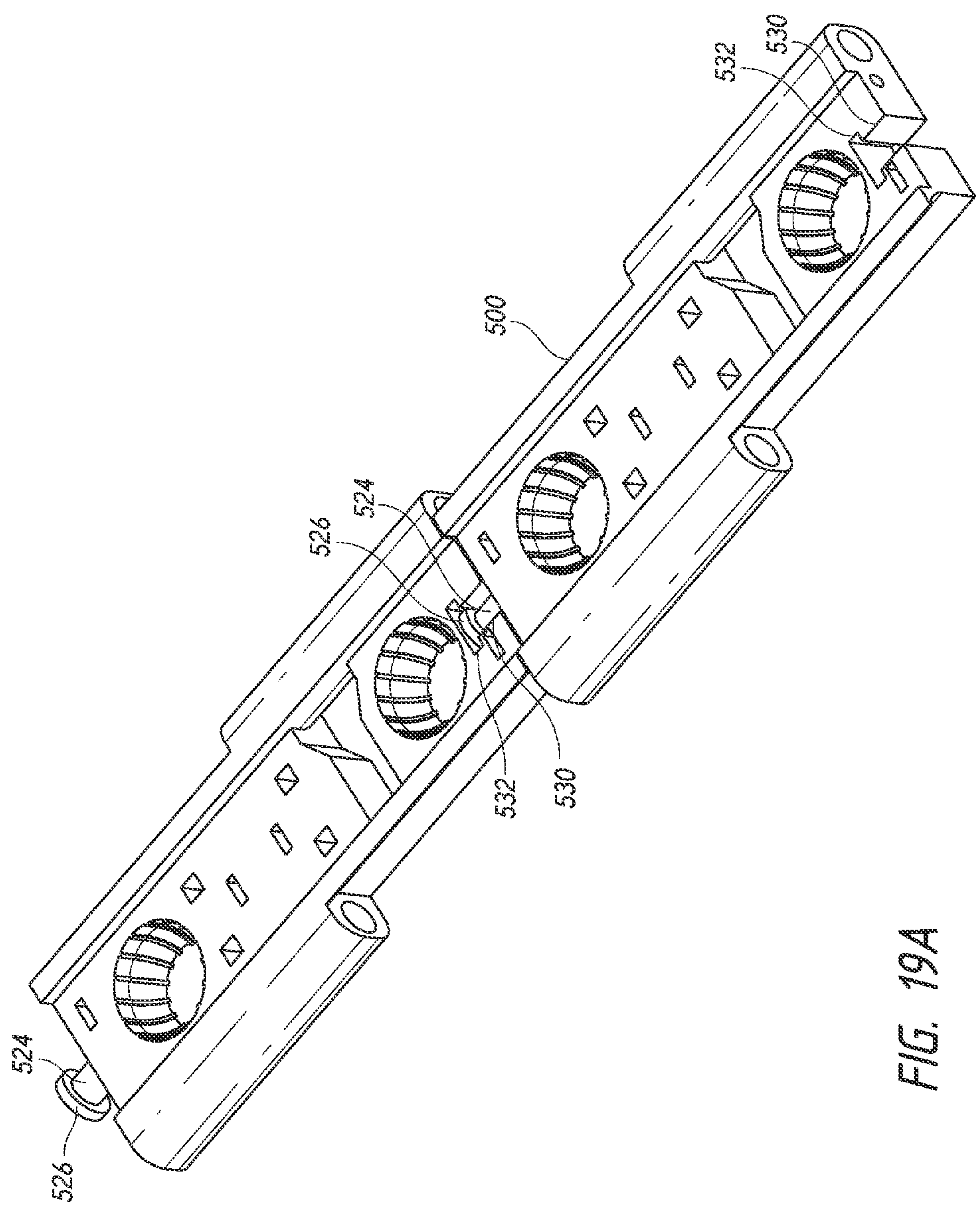
FIG. 19A is a top perspective view of two modules of FIG. 18 with the module upper members and rolling elements not shown.
Figure 19B:
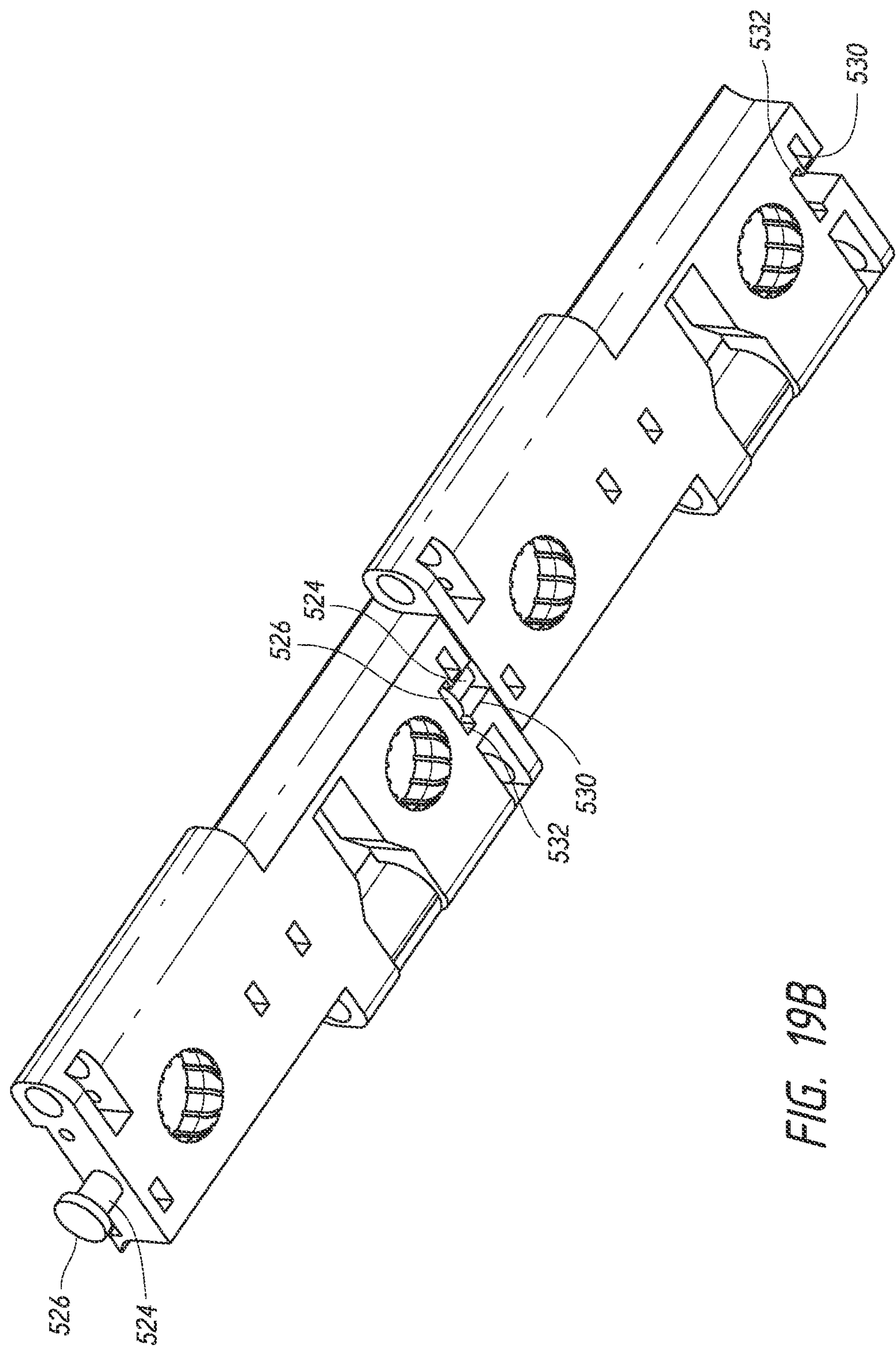
FIG. 19B is a bottom perspective view of the modules of FIG. 19A.
Figure 20A:
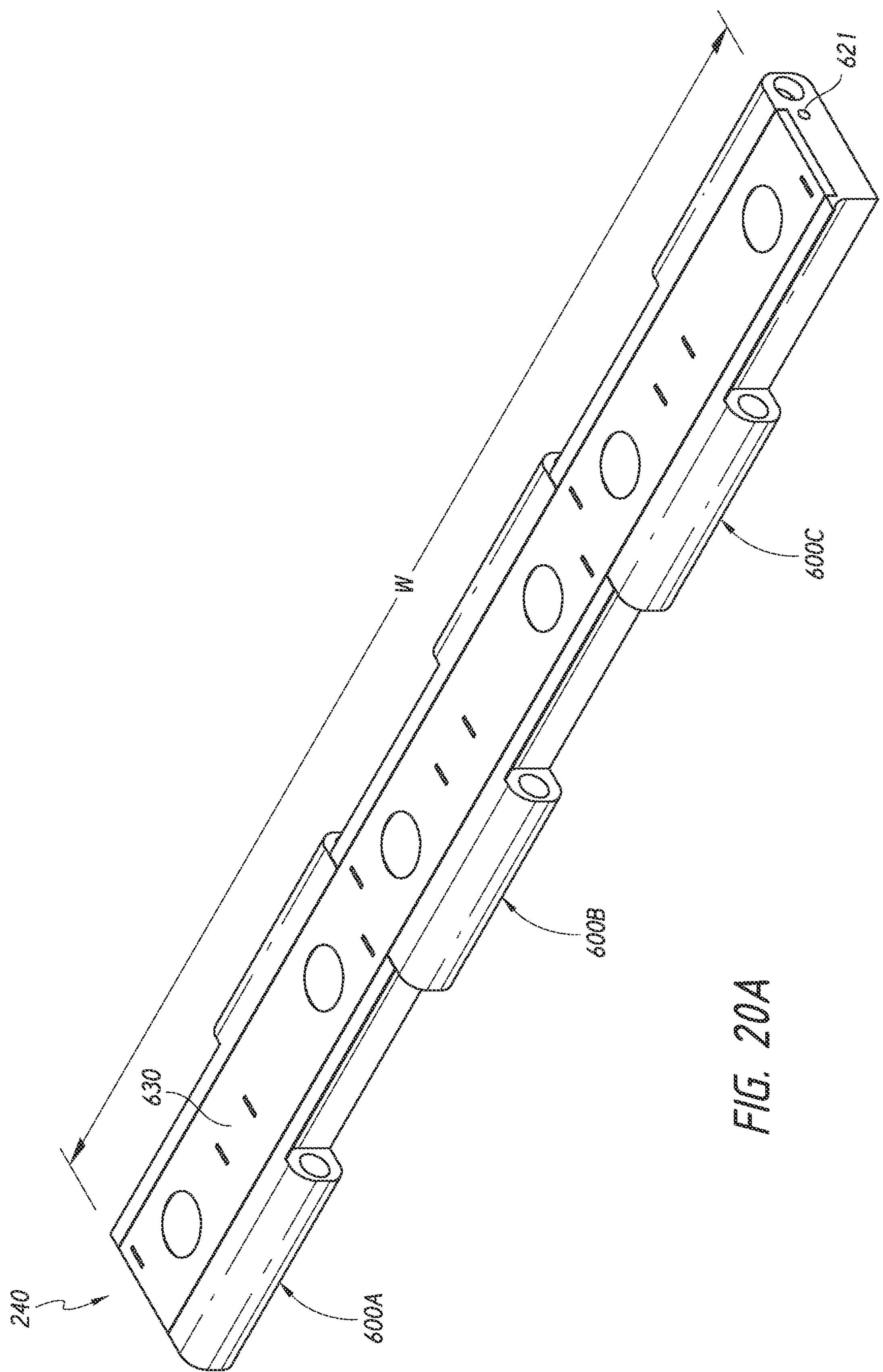
FIG. 20A is a top view of another embodiment of a modular conveyor system, including a module upper member.
Figure 20B:
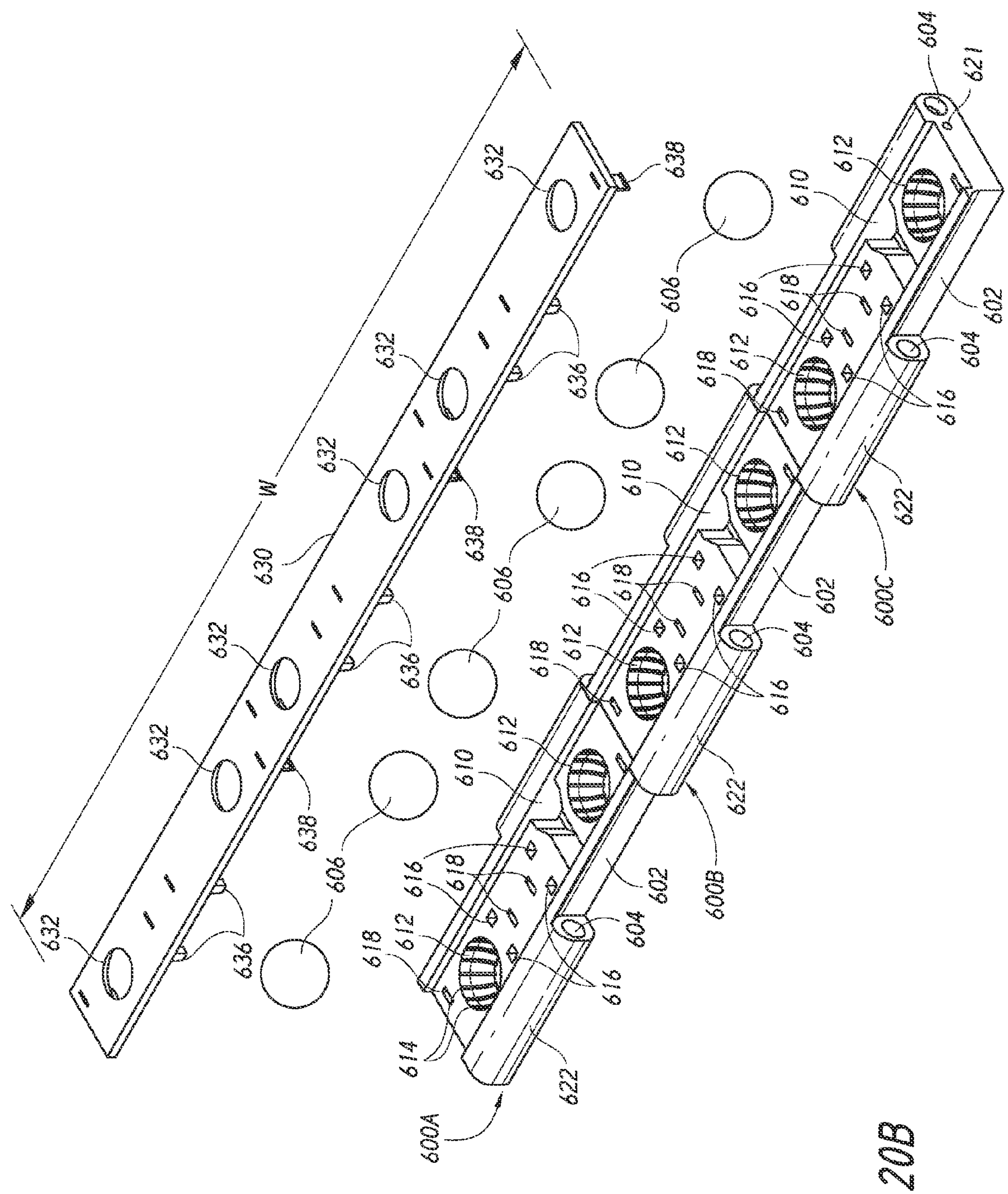
FIG. 20B is a partially exploded top perspective view of the conveyor system of FIG. 20A.
Figure 20C:
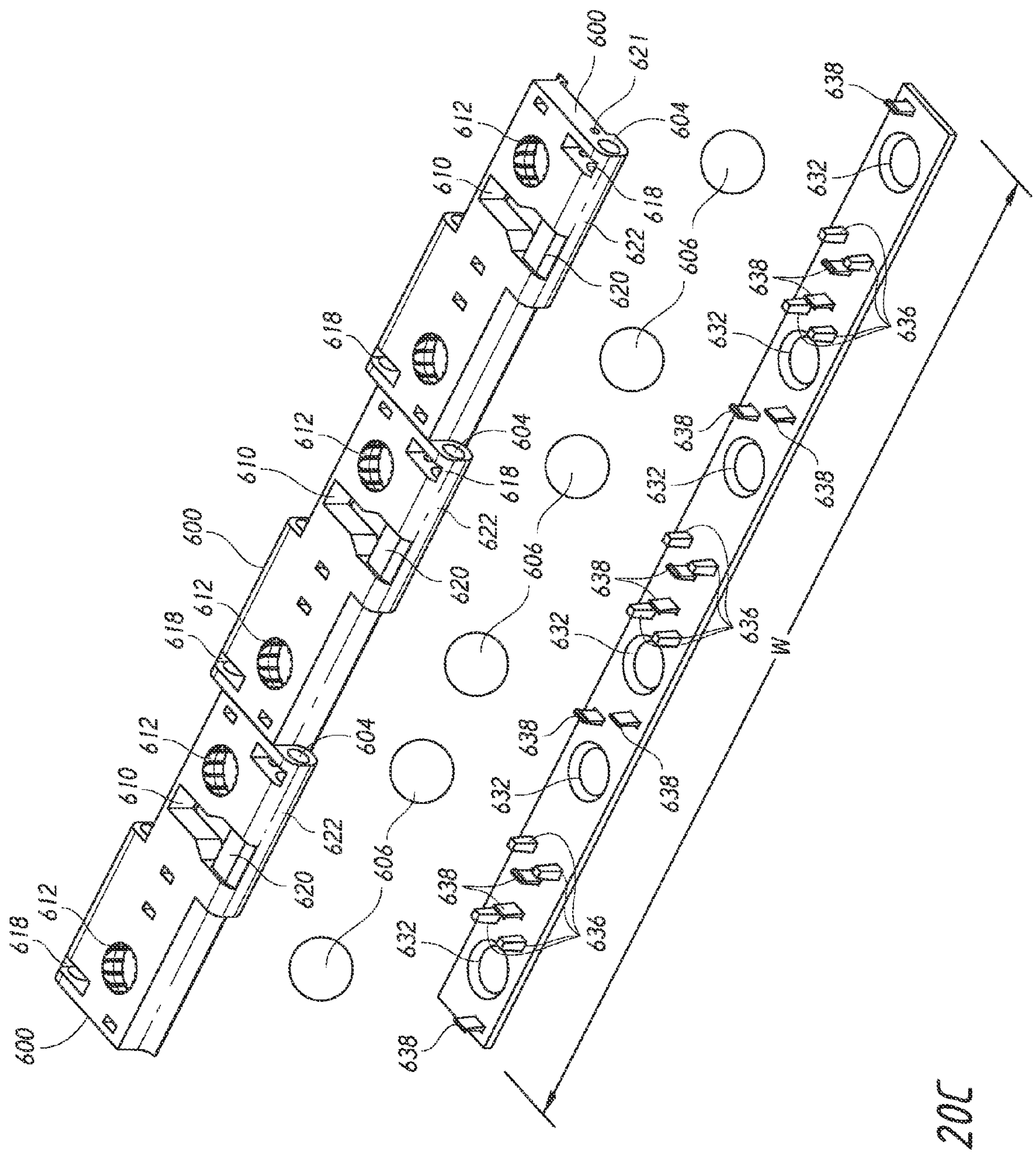
FIG. 20C is a partially exploded bottom perspective view of the conveyor system of FIG. 20B.
Figure 21:
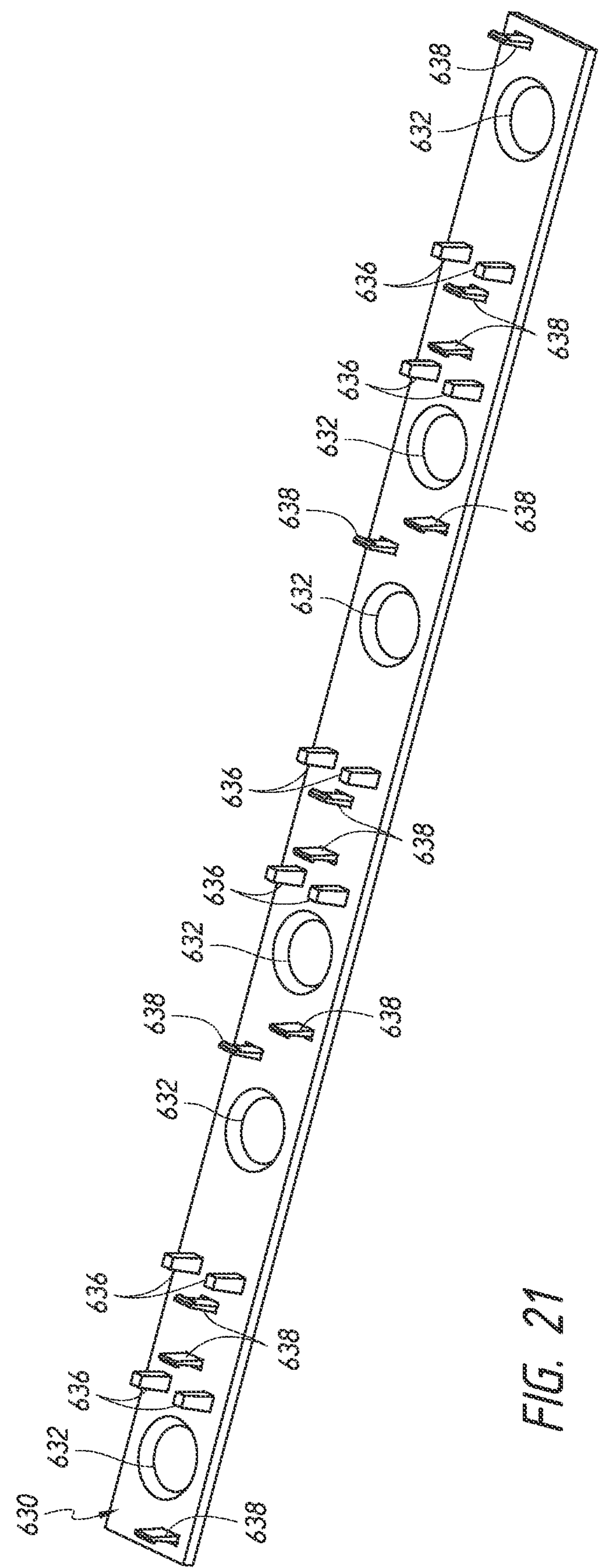
FIG. 21 is a bottom perspective view of the module upper member of FIG. 20A.
Figure 22A:
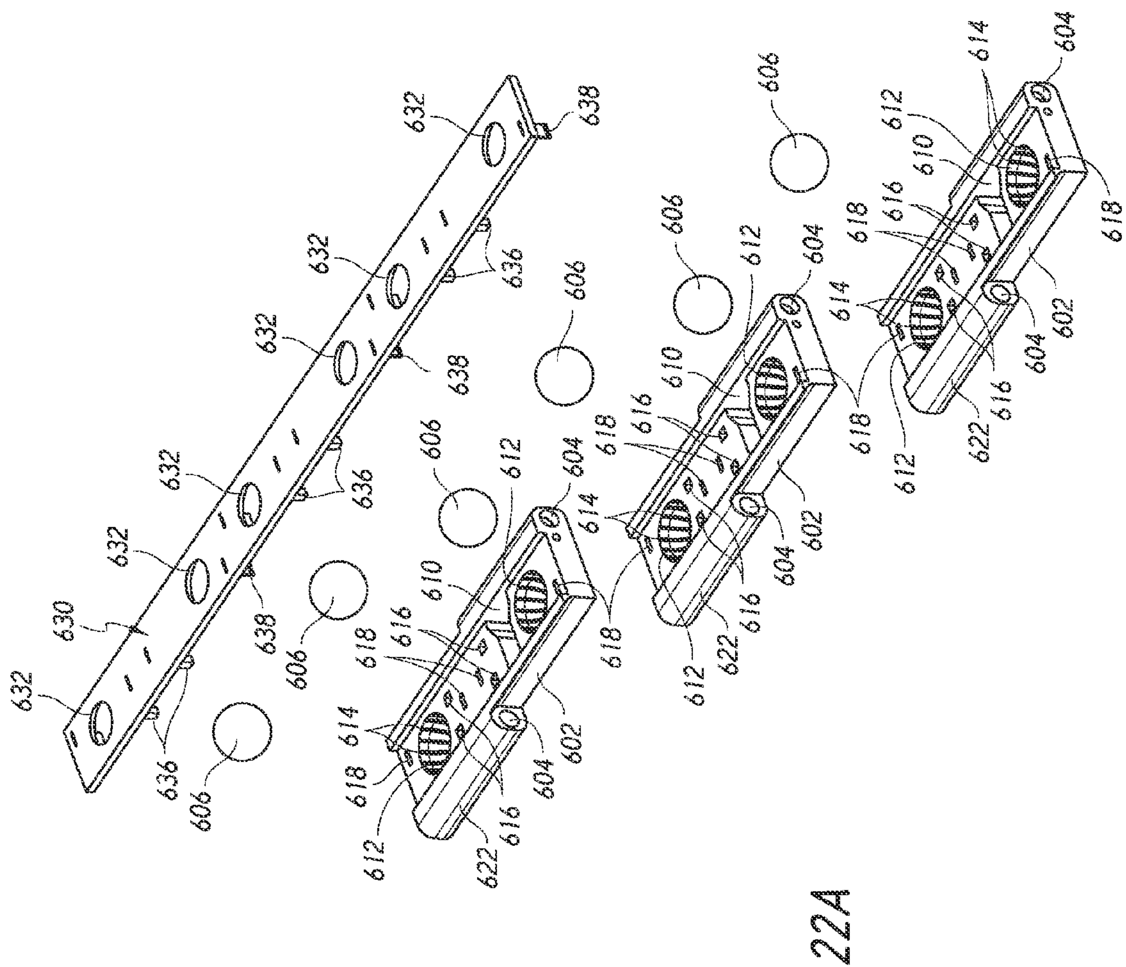
FIG. 22A is an exploded top perspective view of the conveyor system of FIG. 20A.
Figure 22B:
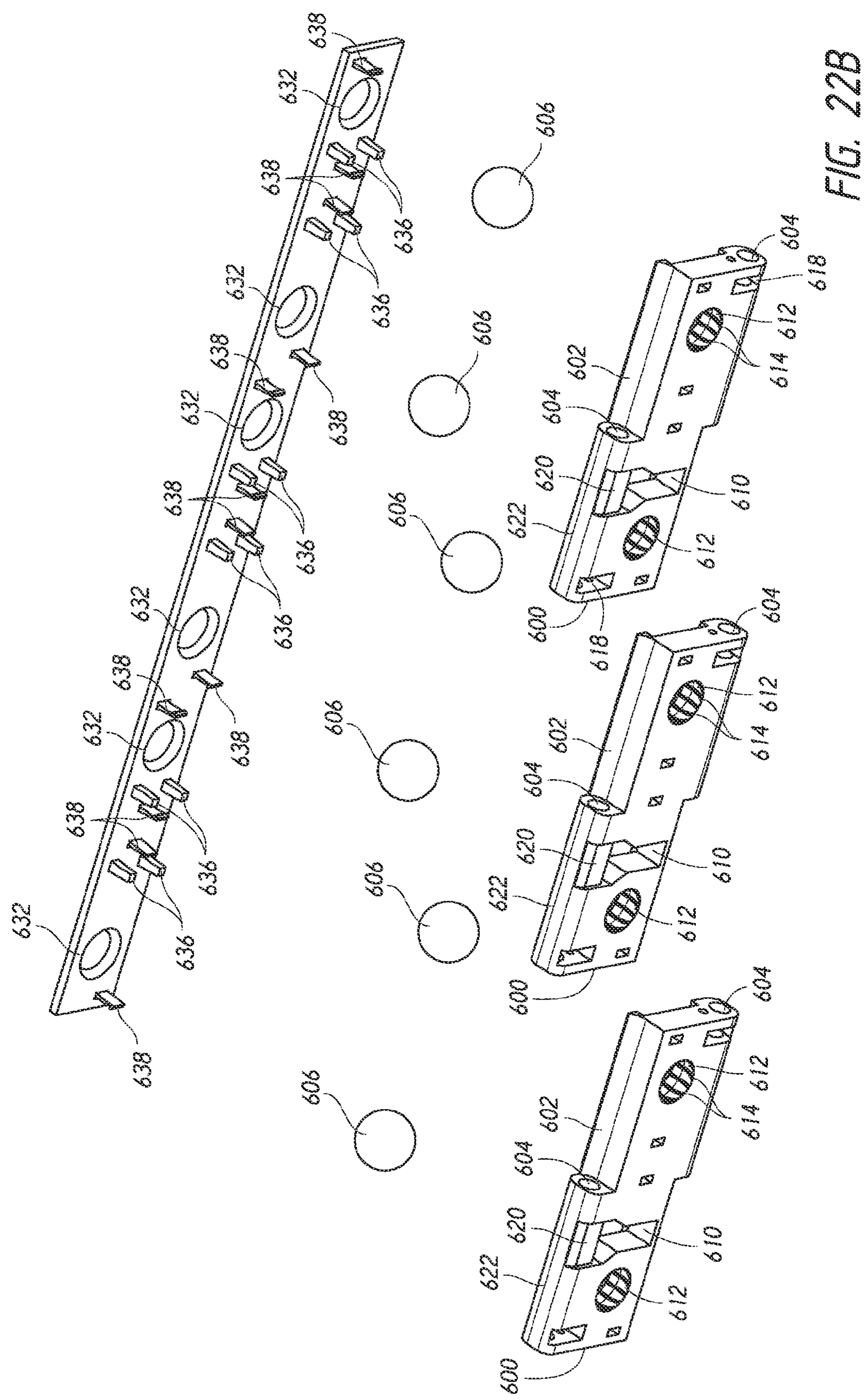
FIG. 22B is an exploded bottom perspective view of the conveyor system of FIG. 22A.

In some embodiments, as shown for example in FIGS. 14 and 15, once the fingers 428 are generally aligned with the rotational securing recesses 432, the male module 400A and the female module 400B can be engaged with each other. For example, in certain variants, when the fingers 428 are generally aligned with the rotational securing recesses 432, the fingers 428 can be received in the rotational securing recesses 432 (e.g., by moving the modules 400A, 400B laterally with respect to each other).

In some embodiments, the fingers 428 and the rotational securing recesses 432 are configured to laterally secure the modules 400A, 400B to each other. For example, in certain variants, the modules 400A, 400B can be rotated into a securing alignment with one another, thereby rotating the fingers 428 into a space 436 of the female module 400B. As shown, the space 436 can be bound by a wall 435, thus presenting an interference that inhibits lateral removal of the fingers 428. In some embodiments, the securing alignment of the modules 400A, 400B occurs when the modules 400A, 400B are generally linearly aligned (e.g., the angle α being about 180°). In some embodiments, the securing alignment occurs when the modules 400A, 400B are at the angle α of at least about 120° and/or less than or equal to about 240°. Lateral connection of the modules 400A, 400B can increase the strength of the conveyor 200 and/or can reduce the chance of unintentional lateral movement of the modules 400A, 400B relative to each other should the pin 202 or clip 206 be damaged or removed.

In some embodiments, retaining pins 202 may be inserted through the legs of the modules via the passages 404A and 404B. In some embodiments, clips 206 can be inserted into the male modules 400A and female modules 400B via the securing holes 418A, 418B. As discussed above, in some embodiments, the clips 206 can be used to secure retaining pins 202 laterally with respect to the module 400A and/or the module 400B. As further described above, in some embodiments, securing mechanism 209 (e.g., a rod) can be inserted into securing apertures 421A, 421B to provide additional securing of the clips 206 within the male module 400A and/or the female module 400B.

In some embodiments, as shown in the figures described above, the modules in the twist interlock-style module system 220 feature male modules 400A and female modules 400B. In some embodiments, as shown in the figures described above, the male module 400A and female module 400B include legs 422A and 422B lacking a male or female interlocking connectors, respectively. In some embodiments, the legs 422A and 422B can combine with another module that lacks male or female attachments via a retaining pin 202. Thus, male modules 400A can be combined to female modules 400B and, in some embodiments, can further be connected to modules lacking male or female parts, for example module 300, to form a new module system.

In some embodiments, the modules of the conveyor 220 can each include male and female connections. For example, in certain variants, one lateral end of the leg of the module 400 can include at least some of the previously described components of the male locking mechanism (e.g., the fingers 428), and the opposite lateral end of the leg of the module 400 can include at least some of the previously described components of the female locking mechanism (e.g., the rotational securing recess 432). Such a configuration can, for example, reduce the total number of different parts by employing a single modular configuration.

In some embodiments, the length of the conveyor 220 can be adjusted by rotationally connecting additional modules (such as described above). As described above, the width of the conveyors can be adjusted by laterally connecting additional modules with the retaining pins 202 (as also described above). For example, in some embodiments, the retaining pins 202 can be secured by clips 206, in the body of the modules. Some embodiments of the conveyor 220 include rods 209 to secure the clip 206 and the module body.

With reference to FIGS. 16A-19B, another embodiment of a modular conveyor 230 is illustrated. In some embodiments, the conveyor system 230 includes a slide-interlock mechanism that can provide lateral connection between laterally adjacent modules, as will be discussed in further detail below. In certain variants, the conveyor 230 can include modules 500. The modules 500 can resemble or be identical to the above described modules 300 of the conveyor 200 in many ways, yet can differ in certain respects, some of which are discussed below.

In some embodiments, the module 500 includes a body 502, passages 504, rolling element 506, a recess 510, a seat 512, and ribs 514. Certain variants include alignment holes 516 and securing holes 518. Certain embodiments include a sprocket recess step 520, a securing aperture 521, and a leg 522. Similar to modules 300, 400A, 400B, and the other modules described below, the modules 500 can include module upper members 540, which can include openings 542, guide members 546, securing members 548. In some implementations, the securing members 548 include projections, such as lips 550, that are configured to engage (e.g., be deflected by and/or snappedly received in) the securing holes 518. In some embodiments, the engagement of the module body 502 and module upper member 540 can enhance the rigidity and/or strength of the modules, and thus the modular conveyor.

In some embodiments, the module 500 includes a lateral linking feature (e.g. a lateral linking member 524) and a laterally adjacent module 500 includes a corresponding lateral linking feature (e.g. lateral linking receiver 530) configured to engage the adjacent modules. In certain implementations, each module 500 includes the lateral linking member 524 and the lateral linking receiver 530. The lateral linking receiver 530 can be configured to receive the lateral linking member 524 from a laterally adjacent module 500. In some embodiments, the lateral linking member 524 includes a protrusion that extends generally laterally from the body 502 of the module 500. In certain variants, the lateral linking member 524 includes a head portion 526, such as a portion having an increased diameter compared to the protrusion. In some embodiments, the lateral linking member 524 has a cross-sectional shape that is generally T-shaped, generally triangular, or otherwise. In some embodiments, the receiver 530 can be partially or completely covered (e.g., by an upper member 540). This can reduce the likelihood of unintentional separation of the lateral linking member 524 and the receiver 530 and/or can aid in protecting the lateral linking member 524 from the environment.

As illustrated, in some embodiments, the lateral linking member 524 can be engaged with the lateral linking receiver 530 of a laterally adjacent module 500. In certain implementations, the lateral linking receiver 530 includes a head receiving portion 532 configured to receive the head portion 526 of the lateral linking member 524. For example, the head receiving portion 532 can include a recess having a shape similar to the head portion 526 and bounded by walls. In some embodiments, the engagement of the head portion 526 with the head receiving portion 532 provides a lateral interference between the walls and the head portion 526, thereby inhibiting lateral movement of the linked laterally adjacent modules.

With reference to FIGS. 20A-22B, another embodiment of a conveyor 240 is illustrated. In some embodiments, the conveyor 240 includes modules 600 and an upper member 630. In some embodiments, the conveyor system 240 includes a spanning-plate interlock feature that can provide lateral connection between laterally adjacent modules, as will be discussed in further detail below. The module 600 of the retaining-plate modular conveyor 240 can resemble or be identical to the above described module 300, in many ways, but can also differ in certain respects, some of which are discussed below.

Similar to the above described module 300, in some embodiments, the module 600 includes a body 602, leg 622, passages 604, and rolling element 606. The modules 600 can include a sprocket recess 610, seat 612, and ribs 614. Some variants have alignment holes 616, securing holes 618, a sprocket recess step 620, securing aperture 621, and a leg 622. In certain implementations, the upper member 630 can include openings 642, guide members 646, and securing members 638. In some embodiments, the securing members 648 include projections, such as lips 650, that are configured to engage (e.g., be deflected by and/or snappedly received in) the securing holes 618. In some embodiments, the engagement of the module body 602 and module upper member 630 can enhance the rigidity and/or strength of the modules, and thus the modular conveyor.

In some embodiments, the upper member 630 is configured to extend between at least a part of two or more of the modules 600, thereby laterally securing the modules to each other. For example, the upper member 630 can be configured to extend across a plurality (e.g., two, three, four, five, or more) of modules 600. As illustrated, some embodiments of the upper member 630 extends a distance W that is about equal to the width of a row of the modules 600A-600C. In some embodiments, the upper member 630 extends across less than two modules, for example about 1.5 modules. In certain embodiments, the upper member 630 has lateral sides that generally align with the lateral sides of at least one of the modules 600. In some implementations, the upper member 630 is configured to extend across less than the entire width of two modules. For example, the upper member 630 can be sized to extend generally from a centerline (extending parallel to the direction of belt travel) of a first module 600 to a centerline (extending parallel to the direction of belt travel) of a second module 600. In certain variants, the first and second modules are laterally adjacent. In some embodiments, the upper member 630 extends across a seam that extends parallel to the direction of belt travel between laterally adjacent modules. In some embodiments, the upper member can be sized so as to be staggered in reference to the modules, such that the upper member 630 spans the gap between two laterally adjacent modules.

Similar to the upper member 330, the upper member 630 can have a plurality of engaging projections, such as guide members 636 and securing members 638. In some embodiments, the projections 636, 638 are configured to engage corresponding holes 616, 618 in some or each of the modules 600. In some embodiments, the upper member 630 can provide added stability and/or strength to the conveyor 240. In some implementations, the module upper member 630 inhibits lateral movement of the modules 600.

Although the modular conveyors have been disclosed in the context of certain embodiments and examples, it will be understood by those skilled in the art that the modular conveyors extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of the conveyor. For example, some modular conveyors within the scope of this disclosure can include the slide-interlock mechanism and of the conveyor 230 and the plate 630 of the conveyor 240. As another example, various combinations of modules 300, 400, 500, and/or 600 could be combined with various combinations of module upper members 330, 440, 540, and 630. In some embodiments, the clips 206, retaining pins 202, male legs 426, female legs 430, lateral linking members, and lateral linking receivers can be used together, or in any combination thereof. For example, the retaining pin 202 and clips 206 can be used in combination with the male and female legs 426, 430 and/or in combination with of the lateral linking members and receivers 524, 530 to create a hybrid connection. As a further example, the male and female legs 426, 430 can be used in combination with the lateral linking members and receivers 524, 530. Any module of modules (e.g., columnar, brick, or mixed columnar and brick) can be used in any of the embodiments. The modules and/or the connection mechanism may be mixed and matched to provide a number of conveyor belts with tailored strengths and stabilities. Thus, the scope of the conveyor disclosed herein should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and that all operations need not be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise. As yet another example, in certain embodiments, the terms "generally perpendicular" and "substantially perpendicular" refer to a value, amount, or characteristic that departs from exactly perpendicular by less than or equal to 15 degrees, 10 degrees, 5 degrees, 3 degrees, 1 degree, 0.1 degree, or otherwise.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various embodiments and examples of modular conveyors have been disclosed. Although the modular conveyors have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. For example, some embodiments can be configured to be used with other types of conveyor systems or configurations. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow.

The invention claimed is:

1. A modular conveyor comprising:

a series of rows of modules, each row extending laterally from a first side of the conveyor to a second side of the conveyor, the module being linked to a forwardly-adjacent module and a rearwardly-adjacent module, the module comprising:

a module body comprising:

a width extending between a first lateral side of the module body and a second lateral side of the module body;

a thickness extending in a direction of travel of the conveyor between a front side of the module body and a rear side of the module body;

a single front leg extending forwardly from the front side, the front leg having a laterally extending first passage;

a single rear leg extending rearwardly from the rear side, the rear leg having a laterally extending second passage;

a seat in communication with a bottom roller opening; and a securing hole;

a cover configured to couple with the module body and to span the width of the module body, the cover comprising:

an upper roller opening; and a securing member configured to engage with the securing hole to secure the cover with the module body;

a spherical rolling element positionable in the seat, a diameter of the spherical rolling element being greater than a diameter of the upper roller opening;

wherein when the spherical rolling element is positioned in the seat and the cover is secured with the module body:

a lower portion of the spherical rolling element extends through the bottom roller opening to facilitate engaging the spherical rolling element with a surface below the module; and an upper portion of the spherical rolling element extends through the upper roller opening to facilitating multi-directional movement of an item on the conveyor;

a first retaining pin configured to extend through the laterally extending first passage and into the forwardly-adjacent module to link the module and the forwardly-adjacent module; and a second retaining pin configured to extend through the laterally extending second passage and into the rearwardly-adjacent module to link the module and the rearwardly-adjacent module.

2. The conveyor of claim 1, wherein the securing member comprises a cantilevered member with a lip.

3. The conveyor of claim 1, wherein the module body further comprises one or more alignment holes configured to receive guide members and the cover comprises guide members, the one or more alignment holes and the guide members configured to interact to guide the securing member and the securing hole into engagement.

4. The conveyor of claim 3, wherein the guide members are at least partially tapered to facilitate reception in the one or more alignment holes.

5. The conveyor of claim 1, wherein the module further comprises a plurality of spherical rolling elements and a corresponding number of the seats.

6. The conveyor of claim 1, further comprising a clip configured to engage the first retaining pin.

7. The conveyor of claim 6, wherein the module comprises a recess configured to receive the clip.

8. The conveyor of claim 7, further comprising a securing feature configured to engage a securing aperture in the module and a corresponding aperture in the clip, thereby inhibiting removal of the clip from the module.

9. The conveyor of claim 1, wherein:

the front leg of the module further comprises a finger configured to be received in a recess in a rearwardly extending leg of the forwardly-adjacent module; and the rear leg of the module further comprises a recess configured receive a finger on a forwardly extending leg of the rearwardly-adjacent module.

10. The conveyor of claim 9, wherein the finger of the module is insertable into the recess in the rearwardly extending leg of the forwardly-adjacent module when the module is positioned at an angle $\alpha$ relative to the forwardly-adjacent module.

11. The conveyor of claim 10, wherein the angle $\alpha$ is at least about 100°.

12. The conveyor of claim 1, wherein each row further comprises a plurality of the modules.

13. The conveyor of claim 12, wherein the plurality of the modules are arranged in rows and columns, the rows extending in laterally from a first side of the conveyor to a second side of the conveyor, the columns extending in the direction of travel of the conveyor.

14. The conveyor of claim 12, wherein the first lateral side of the module body comprises a lateral linking member and the second lateral side of the module body comprises a lateral linking receiver.

15. The conveyor of claim 14, wherein the lateral linking member of one of the plurality of modules engages with the lateral linking receiver of a laterally adjacent one of the plurality of modules.

16. A modular conveyor system comprising:

a plurality of modules arranged in rows and columns, the rows extending laterally from a first side of the conveyor to a second side of the conveyor, the columns extending in a direction of conveyor travel, each of the modules comprising:

module body comprising:

a width extending between a first lateral side of the module body and a second lateral side of the module body;

a thickness extending in the direction of travel of the conveyor between a front side of the module body and a rear side of the module body;

a front leg extending forwardly from the front side, the front leg having a laterally extending first passage;

a rear leg extending rearwardly from the rear side, the rear leg having a laterally extending second passage;

a seat in communication with a bottom roller opening; and a securing hole;

a cover configured to engage with the module body and to span the module body, the upper member comprising:

an upper roller opening; and a securing member configured to engage with the securing hole to secure the cover to the module body;

a rolling element positionable in the seat, wherein when the rolling element is positioned in the seat and the cover is secured to the module body:

a lower portion of the rolling element extends through the bottom roller opening to facilitate engaging the rolling element with a surface below the module; and an upper portion of the rolling element extends through the upper roller opening facilitating multi-directional movement of an item on the conveyor;

a first retaining pin configured to extend through the laterally extending first passage and into the forwardly-adjacent module to link the module and the forwardly-adjacent module; and a second retaining pin configured to extend through the laterally extending second passage and into the rearwardly-adjacent module to link the module and the rearwardly-adjacent module.

17. The modular conveyor system of claim 16, wherein the rolling element is spherical.

18. A module for a modular conveyor, the module comprising:

a module body comprising a top portion comprising a channel, a bottom portion having a first opening, a front side having a single forwardly-extending leg, a rear side having a single rearwardly-extending leg, a first lateral side, a second lateral side, a plurality of recesses, and a securing hole;

wherein a width of the module body is the distance between the first lateral side and the second lateral side;

wherein the forwardly extending leg comprises a laterally extending first passage configured to receive a first retaining pin and the rearwardly extending leg comprises a laterally extending second passage configured to receive a second retaining pin;

a cover received in the channel of the module body, a width of the cover being greater than or equal to the width of the module body, the cover comprising a second opening and a securing member that is engaged with the securing hole to secure the cover and the module body together; and a plurality of rolling elements each positioned in one of the recesses of the module body, wherein a rolling element protrudes through the first opening and the second opening to facilitate multi-directional movement of an item on the conveyor.

19. The module of claim 18, wherein the plurality of rolling elements are spherical.

20. The module of claim 18, wherein a top surface of the cover is flush with a top surface of the forwardly extending leg and a top surface of the rearwardly extending leg.

* * * * *

UNITED STATES PATENT AND TRADEMARK OFFICE

CERTIFICATE OF CORRECTION

PATENT NO. : 8,939,279 B2
APPLICATION NO. : 14/149674
DATED : January 27, 2015
INVENTOR(S) : Porter et al.

It is certified that error appears in the above-identified patent and that said Letters Patent is hereby corrected as shown below:

In the specification

At column 6, line 5, change “indispensible.” to --indispensable.--.

At column 10, line 57, change “or or” to --or--.

In the claims

In Claim 16, at column 19, line 57, before “module” insert --a--.

In Claim 16, at column 20, line 8, change “the upper member” to --the cover--.

Signed and Sealed this
Twenty-seventh Day of October, 2015

Michelle K. Lee
*Director of the United States Patent and Trademark Office*